US009670047B2

(12) United States Patent
Carpenter et al.

(10) Patent No.: US 9,670,047 B2
(45) Date of Patent: Jun. 6, 2017

(54) SYSTEMS AND METHODS FOR PROVIDING DYNAMIC INGREDIENT MATRIX RECONFIGURATION IN A PRODUCT DISPENSER

(75) Inventors: Gregg Carpenter, Marietta, GA (US); David R. Newman, Atlanta, GA (US); H. Brock Kolls, Alpharetta, GA (US); Son V. Tran, Alpharetta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 508 days.

(21) Appl. No.: 12/204,485

(22) Filed: Sep. 4, 2008

(65) Prior Publication Data

US 2009/0069949 A1 Mar. 12, 2009

Related U.S. Application Data

(60) Provisional application No. 60/970,507, filed on Sep. 6, 2007.

(51) Int. Cl.

| | |
|---|---|
| ***G05D 11/13*** | (2006.01) |
| ***B67D 1/00*** | (2006.01) |
| ***B67D 1/08*** | (2006.01) |

(52) U.S. Cl.

CPC ......... *B67D 1/0041* (2013.01); *B67D 1/0021* (2013.01); *B67D 1/0878* (2013.01); *B67D 1/0888* (2013.01); *B67D 2210/00089* (2013.01)

(58) Field of Classification Search

CPC ...................................................... G05D 11/13
USPC ........... 700/283; 222/1, 129.4, 243; 235/381
See application file for complete search history.

(56) References Cited

U.S. PATENT DOCUMENTS

| | | | |
|---|---|---|---|
| 3,991,911 A | 11/1976 | Shannon et al. |
| 4,358,171 A | 11/1982 | Christen |
| 4,525,071 A | 6/1985 | Horowitz et al. |
| 4,563,739 A | 1/1986 | Gerpheide et al. |

(Continued)

FOREIGN PATENT DOCUMENTS

| | | |
|---|---|---|
| BE | 1005369 | 6/1993 |
| CN | 1378432 | 11/2002 |

(Continued)

OTHER PUBLICATIONS

International Search Report and Written Opinion mailed Jun. 26, 2009 for PCT/US2008/075281.

(Continued)

*Primary Examiner* — Tejal Gami
(74) *Attorney, Agent, or Firm* — Eversheds Sutherland (US) LLP

(57) ABSTRACT

Embodiments of the invention include systems and methods for providing dynamic ingredient matrix reconfiguration in a product dispenser. In one embodiment, a system can include an ingredient matrix operable to receive one or more ingredient packages within respective locations. In addition, the system can include a controller in communication with the ingredient matrix and operable to execute a set of instructions operable to receive information associated with one or more ingredient packages. Furthermore, the controller can be operable to determine at least one location within the ingredient matrix for a selected one or more ingredient packages, and output the at least one location within the ingredient matrix for insertion of selected one or more ingredient packages.

35 Claims, 15 Drawing Sheets

(56) References Cited

U.S. PATENT DOCUMENTS

| | | | |
|---|---|---|---|
| 4,819,176 | A | 4/1989 | Ahmed et al. |
| 5,147,068 | A | 9/1992 | Wright |
| 5,255,819 | A | 10/1993 | Peckels |
| 5,312,017 | A | 5/1994 | Schroeder et al. |
| 5,350,082 | A | 9/1994 | Kiriakides, Jr. et al. |
| 5,358,145 | A | 10/1994 | Smith et al. |
| 5,408,917 | A | 4/1995 | Lussi |
| 5,603,430 | A | 2/1997 | Loehrke et al. |
| 5,615,801 | A | 4/1997 | Schroeder et al. |
| 5,691,684 | A | 11/1997 | Murrah |
| 5,715,700 | A | 2/1998 | Credle, Jr. |
| 5,735,436 | A | 4/1998 | Schroeder et al. |
| 5,798,694 | A | 8/1998 | Reber et al. |
| 5,839,610 | A | 11/1998 | Reese et al. |
| 5,842,603 | A | 12/1998 | Schroeder et al. |
| 5,884,807 | A | 3/1999 | Yun |
| 5,997,924 | A | 12/1999 | Olander, Jr. et al. |
| 6,053,359 | A | 4/2000 | Goulet et al. |
| 6,116,460 | A | 9/2000 | Kim et al. |
| 6,119,434 | A | 9/2000 | Andersson |
| 6,131,399 | A | 10/2000 | Hall |
| 6,152,591 | A | 11/2000 | McCall et al. |
| 6,161,059 | A | 12/2000 | Tedesco et al. |
| 6,238,721 | B1 | 5/2001 | Knepler |
| 6,317,649 | B1 | 11/2001 | Tedesco et al. |
| 6,354,468 | B1 | 3/2002 | Riek |
| 6,377,868 | B1 | 4/2002 | Gardner, Jr. |
| 6,378,275 | B1 | 4/2002 | Andersson |
| 6,424,884 | B1 | 7/2002 | Brooke et al. |
| 6,465,035 | B1 | 10/2002 | Knepler |
| 6,470,233 | B1 | 10/2002 | Johnson, Jr. |
| 6,479,086 | B1 | 11/2002 | Knepler |
| 6,564,999 | B1 | 5/2003 | Saveliev et al. |
| 6,572,016 | B2 | 6/2003 | Saveliev et al. |
| 6,618,062 | B1 | 9/2003 | Brown et al. |
| 6,622,064 | B2 | 9/2003 | Bartholomew et al. |
| 6,658,323 | B2 | 12/2003 | Tedesco et al. |
| 6,688,134 | B2 | 2/2004 | Barton et al. |
| 6,698,228 | B2 | 3/2004 | Kateman et al. |
| 6,751,525 | B1 | 6/2004 | Crisp |
| 6,756,069 | B2 | 6/2004 | Scoville et al. |
| 6,759,072 | B1 | 7/2004 | Gutwein |
| 6,772,944 | B2 | 8/2004 | Brown |
| 6,799,085 | B1 | 9/2004 | Crisp |
| 6,807,460 | B2 | 10/2004 | Black et al. |
| 6,907,741 | B2 | 6/2005 | Kateman |
| 6,918,258 | B2 | 7/2005 | Cunha et al. |
| 6,941,858 | B2 | 9/2005 | Kateman |
| 6,968,876 | B2 | 11/2005 | Yacko et al. |
| 6,973,478 | B1 | 12/2005 | Ketonen et al. |
| 6,974,928 | B2 | 12/2005 | Bloom |
| 6,980,886 | B2 | 12/2005 | Shimoda et al. |
| 6,980,887 | B2 | 12/2005 | Varga et al. |
| 6,982,640 | B2 | 1/2006 | Lindsay et al. |
| 6,990,391 | B1 | 1/2006 | Cunha et al. |
| 7,009,519 | B2 | 3/2006 | Leonard et al. |
| 7,020,680 | B2 | 3/2006 | Defosse |
| 7,028,861 | B2 | 4/2006 | Sayers et al. |
| 7,031,804 | B2 | 4/2006 | Brooke et al. |
| 7,032,818 | B2 | 4/2006 | Thomas |
| 7,053,773 | B2 | 5/2006 | McGarry et al. |
| 7,065,429 | B1 | 6/2006 | McClain et al. |
| 7,082,970 | B2 | 8/2006 | Bartholomew et al. |
| 7,147,131 | B2 | 12/2006 | Sher et al. |
| 7,151,982 | B2 | 12/2006 | Liff et al. |
| 7,156,259 | B2 | 1/2007 | Bethuy et al. |
| 7,161,494 | B2 | 1/2007 | Akuzawa |
| 7,223,427 | B2 | 5/2007 | Knepler |
| 7,231,279 | B2 | 6/2007 | Ghidotti |
| 7,234,609 | B2 | 6/2007 | DeLazzer et al. |
| 7,249,050 | B1 | 7/2007 | Walker et al. |
| 7,331,483 | B2 | 2/2008 | Bhimani et al. |
| 7,353,080 | B2 | 4/2008 | Walker et al. |
| 7,387,239 | B2 | 6/2008 | Thomas et al. |
| 7,391,318 | B2 | 6/2008 | Higashi |
| 7,395,134 | B2 | 7/2008 | Bartholomew et al. |
| 7,499,768 | B2 | 3/2009 | Hoersten et al. |
| 7,499,769 | B2 | 3/2009 | Walker et al. |
| 7,627,496 | B2 | 12/2009 | Walker et al. |
| 7,640,755 | B1 | 1/2010 | Kateman |
| 7,673,555 | B2 | 3/2010 | Nosler et al. |
| 7,912,579 | B2 | 3/2011 | Stettes |
| 7,918,368 | B2 | 4/2011 | Crisp et al. |
| 8,340,815 | B2 | 12/2012 | Peters et al. |
| 2002/0059175 | A1 | 5/2002 | Nakano |
| 2002/0065579 | A1 | 5/2002 | Tedesco et al. |
| 2002/0077889 | A1 | 6/2002 | Kolls |
| 2002/0116261 | A1 | 8/2002 | Moskowitz et al. |
| 2002/0123926 | A1 | 9/2002 | Bushold et al. |
| 2002/0129712 | A1 | 9/2002 | Westbrook et al. |
| 2002/0143626 | A1 | 10/2002 | Voltmer et al. |
| 2002/0161653 | A1 | 10/2002 | Walker et al. |
| 2002/0183893 | A1 | 12/2002 | Brooke et al. |
| 2003/0010791 | A1 | 1/2003 | Gentiluomo et al. |
| 2003/0032474 | A1 | 2/2003 | Kaminkow |
| 2003/0083758 | A1 | 5/2003 | Williamson |
| 2003/0129286 | A1 | 7/2003 | Knepler |
| 2003/0191709 | A1 | 10/2003 | Elston et al. |
| 2003/0216964 | A1 | 11/2003 | MacLean et al. |
| 2004/0044584 | A1 | 3/2004 | Chung |
| 2004/0103033 | A1 | 5/2004 | Reade et al. |
| 2004/0113786 | A1 | 6/2004 | Maloney |
| 2004/0129720 | A1 | 7/2004 | Cheng et al. |
| 2004/0226994 | A1 | 11/2004 | Brown |
| 2004/0243259 | A1 | 12/2004 | Peterson et al. |
| 2005/0003068 | A1 | 1/2005 | Kester et al. |
| 2005/0075900 | A1 | 4/2005 | Arguimbau |
| 2005/0143857 | A1 | 6/2005 | Chirnomas |
| 2005/0167493 | A1 | 8/2005 | Barton et al. |
| 2005/0178144 | A1 | 8/2005 | Crisp |
| 2005/0178793 | A1 | 8/2005 | Cheng et al. |
| 2005/0182599 | A1 | 8/2005 | Knepler |
| 2005/0192705 | A1 | 9/2005 | Pinney et al. |
| 2005/0205666 | A1 | 9/2005 | Ward et al. |
| 2005/0258961 | A1 | 11/2005 | Kimball et al. |
| 2005/0276883 | A1 | 12/2005 | Jeffrey et al. |
| 2006/0000851 | A1 | 1/2006 | Girard et al. |
| 2006/0043101 | A1 | 3/2006 | Bhimani et al. |
| 2006/0043111 | A1 | 3/2006 | Jennings et al. |
| 2006/0051614 | A1 | 3/2006 | Su et al. |
| 2006/0054614 | A1 | 3/2006 | Baxter et al. |
| 2006/0081653 | A1* | 4/2006 | Boland et al. ................ 222/243 |
| 2006/0102645 | A1 | 5/2006 | Walker et al. |
| 2006/0108415 | A1 | 5/2006 | Thomas et al. |
| 2006/0111978 | A1 | 5/2006 | Tietzen et al. |
| 2006/0115570 | A1 | 6/2006 | Guerrero et al. |
| 2006/0115572 | A1 | 6/2006 | Guerrero et al. |
| 2006/0131329 | A1 | 6/2006 | Sayers et al. |
| 2006/0144244 | A1 | 7/2006 | Girard et al. |
| 2006/0180647 | A1 | 8/2006 | Hansen |
| 2006/0192003 | A1 | 8/2006 | Chung |
| 2006/0224696 | A1 | 10/2006 | King et al. |
| 2006/0247824 | A1 | 11/2006 | Walker et al. |
| 2006/0261156 | A1 | 11/2006 | Brown |
| 2006/0272922 | A1 | 12/2006 | Hoersten et al. |
| 2007/0016852 | A1 | 1/2007 | Kim et al. |
| 2007/0027576 | A1 | 2/2007 | Juds et al. |
| 2007/0044820 | A1 | 3/2007 | Chan et al. |
| 2007/0087756 | A1 | 4/2007 | Hoffberg |
| 2007/0124204 | A1 | 5/2007 | De Boer et al. |
| 2007/0252709 | A1 | 11/2007 | Collins et al. |
| 2007/0299555 | A1 | 12/2007 | Walker et al. |
| 2008/0004973 | A1 | 1/2008 | Rothschild |
| 2008/0029541 | A1 | 2/2008 | Wallace et al. |
| 2008/0051193 | A1 | 2/2008 | Kaminkow et al. |
| 2008/0116262 | A1* | 5/2008 | Majer .......................... 235/381 |
| 2008/0173705 | A1 | 7/2008 | Girard et al. |
| 2008/0201241 | A1 | 8/2008 | Pecoraro |
| 2009/0065520 | A1 | 3/2009 | Peters et al. |
| 2009/0069930 | A1 | 3/2009 | Peters et al. |
| 2009/0069931 | A1 | 3/2009 | Peters et al. |
| 2009/0070234 | A1 | 3/2009 | Peters et al. |
| 2010/0114368 | A1 | 5/2010 | Walker et al. |
| 2010/0116842 | A1 | 5/2010 | Hecht |

(56) References Cited

U.S. PATENT DOCUMENTS

| | | | |
|---|---|---|---|
| 2011/0315711 A1 | 12/2011 | Hecht et al. | |
| 2012/0037008 A1 | 2/2012 | Rodriguez | |
| 2013/0079926 A1 | 3/2013 | Peters et al. | |

FOREIGN PATENT DOCUMENTS

| | | | |
|---|---|---|---|
| DE | 4013147 | | 10/1991 |
| EP | 1165428 | | 7/2003 |
| EP | 1626375 | A1 | 2/2006 |
| EP | 1637055 | | 3/2006 |
| FR | 2624844 | | 6/1989 |
| FR | 2624844 | A | 6/1989 |
| GB | 2416757 | A | 9/2004 |
| JP | S59-55597 | | 3/1984 |
| JP | S61-288289 | | 12/1986 |
| JP | H05-094577 | | 4/1993 |
| JP | H05-128349 | | 5/1993 |
| JP | H05-089329 | | 9/1993 |
| JP | H11-262649 | | 9/1999 |
| JP | 2000099822 | | 4/2000 |
| JP | 2001250161 | | 9/2001 |
| JP | 2001-319026 | | 11/2001 |
| JP | 2002099950 | | 4/2002 |
| JP | 2002245536 | | 8/2002 |
| JP | 2002538561 | | 11/2002 |
| JP | 2003016164 | | 1/2003 |
| JP | 2003506184 | | 2/2003 |
| JP | 2003-303372 | | 10/2003 |
| JP | 2003337974 | | 11/2003 |
| JP | 2005276148 | | 10/2005 |
| JP | 2006309336 | | 11/2006 |
| JP | 2009524868 | | 7/2009 |
| RU | 2054901 | | 5/1996 |
| RU | 2146102 | | 10/2000 |
| RU | 2297385 | | 4/2007 |
| WO | 9837518 | | 8/1998 |
| WO | 0211087 | A1 | 2/2002 |
| WO | 02083282 | | 10/2002 |
| WO | 2005063091 | | 7/2005 |
| WO | 2005091236 | A1 | 9/2005 |
| WO | 2006101394 | A | 9/2005 |
| WO | 2006101394 | A2 | 9/2006 |
| WO | 2006131431 | A1 | 12/2006 |
| WO | 2007056407 | | 5/2007 |
| WO | 2007070032 | A1 | 6/2007 |
| WO | 2007085925 | | 8/2007 |
| WO | 2007127525 | | 11/2007 |
| WO | 2009032911 | A1 | 3/2009 |
| WO | 2009032938 | A2 | 3/2009 |
| WO | 2009032942 | A2 | 3/2009 |
| WO | 2009032946 | A1 | 3/2009 |

OTHER PUBLICATIONS

Disclosure Under 37 C.F.R. §1.56 as filed Dec. 22, 2008.

International Search Report and Written Opinion for PCT/US2008/075277 dated Apr. 24, 2009.

Invitation to Pay Additional Fees and Partial International Search for PCT/US2008/075281 dated Mar. 13, 2009.

International Search Report and Written Opinion for PCT/US2008/075235 dated Feb. 4, 2009.

International Search Report and Written Opinion for PCT/US2008/075287 dated Feb. 18, 2009.

International Search Report and Written Opinion for PCT/US2008/075272 dated Apr. 6, 2009.

* cited by examiner

1000

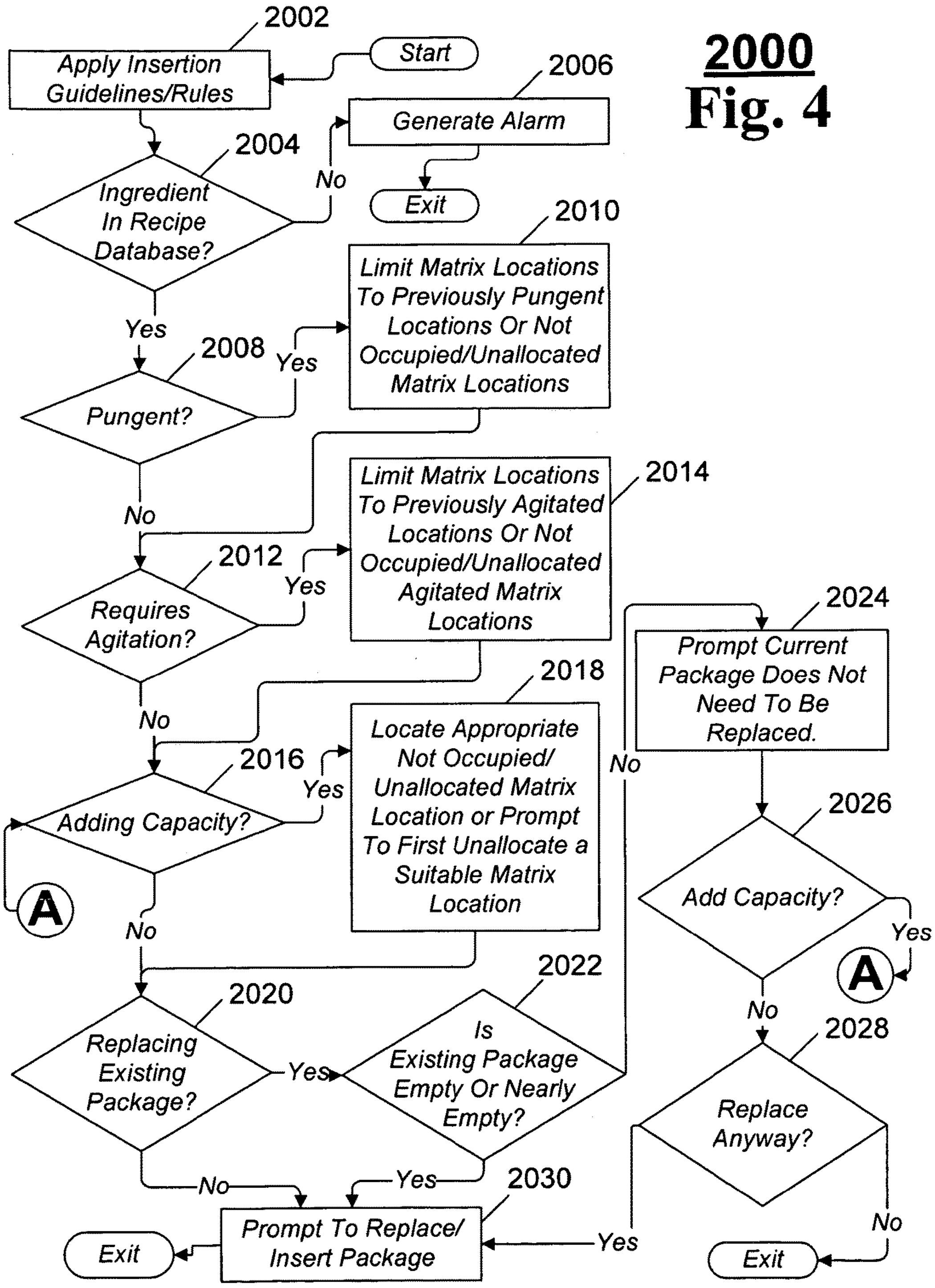
2000
Fig. 4
Start
2002
Apply Insertion Guidelines/Rules
2004
Ingredient In Recipe Database?
No
2006
Generate Alarm
Exit
Yes
2008
Pungent?
Yes
2010
Limit Matrix Locations To Previously Pungent Locations Or Not Occupied/Unallocated Matrix Locations
No
2012
Requires Agitation?
Yes
2014
Limit Matrix Locations To Previously Agitated Locations Or Not Occupied/Unallocated Agitated Matrix Locations
No
2016
Adding Capacity?
Yes
2018
Locate Appropriate Not Occupied/ Unallocated Matrix Location or Prompt To First Unallocate a Suitable Matrix Location
A
No
2020
Replacing Existing Package?
Yes
2022
Is Existing Package Empty Or Nearly Empty?
No
Yes
No
2024
Prompt Current Package Does Not Need To Be Replaced.
2026
Add Capacity?
Yes
A
No
2028
Replace Anyway?
Yes
No
2030
Prompt To Replace/ Insert Package
Exit
Exit

3000

4000

5000

6000

SYSTEMS AND METHODS FOR PROVIDING DYNAMIC INGREDIENT MATRIX RECONFIGURATION IN A PRODUCT DISPENSER

RELATED APPLICATIONS

This application claims priority to U.S. Provisional Ser. No. 60/970,507, entitled "Systems and Methods for Providing Dynamic Ingredient Matrix Reconfiguration in a Beverage Forming Dispenser," filed on Sep. 6, 2007, the contents of which are incorporated by reference.

TRADEMARKS

COCA-COLA® is a registered trademark of The Coca-Cola Company, Atlanta, Ga., U.S.A. Other names, symbols, designs, or logos used herein may be registered trademarks, trademarks or product names of The Coca-Cola Company or other companies.

TECHNICAL FIELD OF THE INVENTION

This invention relates to beverage dispensers, and in particular, relates to systems and methods for providing dynamic ingredient matrix reconfiguration in a product dispenser.

BACKGROUND OF THE INVENTION

Conventional beverage dispensers can pour a beverage by combining a syrup, sweetener, and/or water. To create a finite variety of beverage selections different kinds of syrup can be offered. This typically results in being able to offer a finite number of branded and non-branded beverage selections. As an example, a single prior art dispenser using several different kinds of syrup might be able to offer limited choices of COCA-COLA™, DIET COCA-COLA™, SPRITE™, and a few other branded or non-branded beverage selections.

One problem with these types of conventional beverage dispensers is that only a limited number of drinks can be offered. As such, conventional beverage dispensers may be limited in being able to offer the consumer what they want. In this regard, consumers want a wider menu of beverage selections and the ability to customize their beverage. Research suggests that they want more beverage variations even for a traditional branded beverage. For example, offering COCA-COLA™, COCA-COLA™ with lime, CHERRY COCA-COLA™, VANILLA COCA-COLA™ and numerous other types of COCA-COLA™ beverage variations. Offering all the variations possible for a single drink brand such as COCA-COLA™ are impractical in conventional beverage dispensers in part because conventional beverage dispensers have limited capacity and selection capability. They may not offer the consumer what the consumer wants, that is, a complete variety of choices for all types of branded and non-branded beverages.

SUMMARY OF THE INVENTION

Some or all of the above needs and/or problems may be addressed by embodiments of the invention. Embodiments of the invention can include systems and methods for providing dynamic ingredient matrix reconfiguration in a product dispenser. In one embodiment, a product dispenser can include an ingredient matrix operable to receive one or more ingredient packages within respective locations. In addition, the product dispenser can include a controller in communication with the ingredient matrix and operable to execute a set of instructions operable to receive information associated with one or more ingredient packages. Furthermore, the controller can be operable to determine at least one location within the ingredient matrix for a selected one or more ingredient packages, and output the at least one location within the ingredient matrix for insertion of selected one or more ingredient packages.

Another embodiment can provide systems and methods for configuring an ingredient matrix associated with a product dispenser comprising a plurality of dispensing devices. In this embodiment, a method can include receiving information associated with one or more ingredient packages. In addition, the method can include determining at least one location within the ingredient matrix for a selected one or more ingredient packages. Furthermore, the method can include outputting the at least one location within the ingredient matrix for the selected one or more ingredient packages.

Yet another embodiment can provide systems and methods for using a product dispenser. In this embodiment, a method can include observing a user interface for an indication of at least one location to insert at least one ingredient package within an ingredient matrix. In addition, the method can include inserting the at least one ingredient package within the ingredient matrix. Furthermore, the method can include observing the user interface to determine whether the at least one ingredient package is suitably inserted within the ingredient matrix. Moreover, the method can include based at least in part on an indication from the user interface, suitably inserting the at least one ingredient package within the ingredient matrix.

In yet another embodiment, a method for configuring an ingredient matrix associated with a product dispenser comprising a plurality of dispensing devices can be provided. The method can include receiving information associated with a plurality of ingredient packages operable to be inserted within an ingredient matrix. In addition, the method can include determining at least one association between some or all of the plurality of ingredient packages and one or more of a plurality of dispensing devices. Furthermore, the method can include detecting an event associated with at least one of the plurality of ingredient packages. Moreover, the method can include based at least in part on the event, determining whether to modify the at least one association or modifying an operational characteristic of one or more of a plurality of dispensing devices.

In yet another embodiment, a product dispenser can be provided. In this embodiment, the product dispenser can include an ingredient matrix operable to receive one or more product forming ingredient packages within respective locations. In addition, the dispenser can include a controller operable to execute a set of instructions operable to: receive information associated with a plurality of product forming ingredient packages operable to be inserted within an ingredient matrix. Furthermore, the dispenser can be operable to determine at least one association between some or all of the plurality of product forming ingredient packages and one or more of a plurality of dispensing devices. Moreover, the product dispenser can be operable to detect an event associated with at least one of the plurality of product forming ingredient packages, and determine whether to modify the at least one association based at least in part on the event.

Additional systems, methods, dispensers apparatus, features and advantages are realized through the techniques of various embodiments of the invention. Other embodiments and aspects of the invention are described in detail herein and are considered a part of the claimed invention. Other advantages and features can be understood with reference to the description and to the drawings.

BRIEF DESCRIPTION OF THE FIGURES

The foregoing and other objects, features, and advantages of the invention are apparent from the following detailed description taken in conjunction with the accompanying drawings in which:

FIG. 4 illustrates one example of a method of applying insertion rules to determine the correct location within the ingredient matrix to place a product forming ingredient package in accordance with an embodiment of the invention.

The detailed description explains various embodiments of the invention, together with advantages and features, by way of example with reference to the drawings.

DETAILED DESCRIPTION OF EMBODIMENTS OF THE INVENTION

As used herein, the terms “beverage forming dispenser”, “product dispenser”, “beverage dispenser”, “dispenser apparatus”, and “dispenser” refer to a device which dispenses a product such as a beverage, can, bottle, or container.

As used herein, the terms “product” and “beverage”, and their pluralized forms, are used synonymously, and embodiments of the invention should not be limited in scope by the use of either term.

Figure 1A:
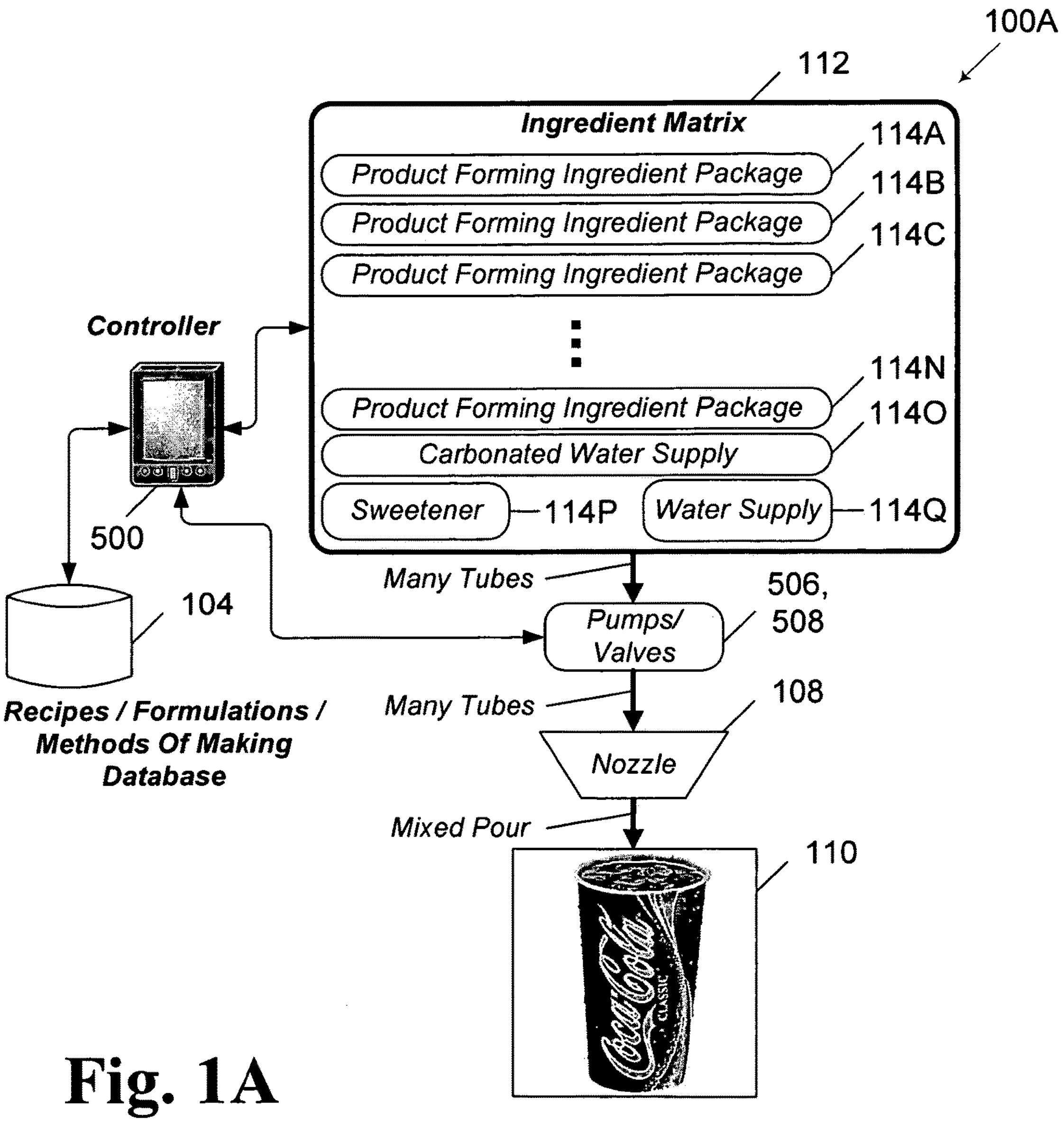
FIG. 1A illustrates one example of product dispenser having a controller operationally related to an ingredient matrix in accordance with an embodiment of the invention.

Turning now to the drawings in greater detail, it will be seen that in FIG. 1A there is one example of a product dispenser 100 having a controller operationally related to an ingredient matrix. In one embodiment, a plurality of product forming ingredient packages or ingredient packages can be inserted into an ingredient matrix 112. The ingredient matrix can secure each of the plurality of product forming ingredient packages, such as 114A-114Q. In addition, the ingredient matrix 112 is operationally related to a controller 500 and to a plurality of pumps 506 and/or valves 508. In this regard, under control of the controller 500 the plurality of pumps 506 and/or valves 508 can be operated to effectuate the precise pumping of product forming products from certain of the plurality of product forming ingredient packages 114A-114Q to dispense a custom product or beverage.

In one embodiment, the ingredient matrix 112 can have dozens of different types and kinds of product forming ingredient packages, such as 114A-114Q inserted into it. In operation, each of the product forming ingredient packages 114A-114Q can be selectively combined per a recipe in varying ratios to form a plurality of different kinds of products.

By way of example, a consumer can make a product or beverage type selection at a user interface associated with the controller 500. A recipe to form the selected product or beverage including ingredients and ratio of ingredients can be obtained by the controller 500 from a database 104 local to the controller 500 or from a remote data processing resource such as a server or data processing resource, such as 102 in FIG. 1B. The controller 500 can operate any certain of the plurality of pumps 506 and/or valves 508 to form and dispense a product or beverage by way of nozzle 108 into cup 110. In one embodiment, a recipe can be input, derived, or otherwise encoded on the product forming ingredient packages, such as 114A-114Q.

In conventional product dispensers, the consumer may activate a switch to cause syrup to be combined with sweetener and/or water. In this regard, conventional product dispensers may be limited to a finite number of product choices and may not offer the consumer an opportunity to customize his or her product, such as a beverage.

In contrast, product forming systems and methods in accordance with embodiments of the invention can store any number of ingredients such as lime flavoring, vanilla flavoring, cherry flavoring, and various ingredient parts of many branded and non-branded drinks. An advantage is that, for example and not as a limitation, a COCA-COLA™ can be poured, or by adding cherry flavoring a CHERRY COCA-COLA™ can be poured, or by adding vanilla flavoring and changing the formula a DIET VANILLA COCA-COLA™ can be poured. In one embodiment, by having a controller 500 operationally related to a plurality of product forming ingredient packages 114 and a plurality of pumps 506 and valves 508, a consumer can form and pour a plurality of different kinds of products or beverages by adding flavoring, and/or combining and varying ingredients and ingredient ratios.

Referring to FIG. 1A, there is illustrated one example of a controller 500 operationally related to an ingredient matrix 112, a plurality of pumps 506, and a plurality of valves 508. Furthermore, controller 500 is operationally related to a database 104 that includes product or beverage recipes, formulations, and methods of making products or beverages. Such product or beverage recipes, formulations, and methods of making products or beverages can include an ingredient list, the ratio of each ingredient, a listing of how a product or beverage can be customized by a consumer, and/or other types and kinds of product or beverage recipes, formulations, and methods of making a product or beverage as may be required and/or desired by a particular embodiment. The controller 500 can be operable to execute a set of instructions to form one or more products or beverages from one or more of the product forming ingredient packages for dispensing to a consumer. Also illustrated in the Figure is a nozzle 108. Nozzle 108 combines the flows from the plurality of pumps 506 and valves 508 to mix and dispense the product or beverage into cup 110.

With regards to the ingredient matrix 112, there is illustrated in the Figure how a plurality of product forming ingredient packages, such as 114A-114Q, can be physically inserted into respective locations within the ingredient matrix 112, secured, and associated with a unique pump 506 or valve 508. Then in operation, by way of pumps 506 and valves 508, as required by a recipe, select product forming ingredient packages, such as 114A-114Q, can be pumped in precise amounts or ratios to form branded products or beverages such as CHERRY COCA-COLA™, VANILLA COCA-COLA™, COCA-COLA™, DIET COCA-COLA™, and FANTA™, as well as a vast range of other branded products or beverages, non-branded products or beverages, and/or consumer customized products or beverages.

In some embodiments, beverage forming packages, such as 114A-114Q, can be collectively or generally referred to as product forming ingredient package 114. Each product forming ingredient package 114 can be manufactured as a pouch of liquid secured in a plastic ridged container to allow insertion into the ingredient matrix 112. When inserted into the ingredient matrix 112 the pouch can be pierced by at least one fitting allowing the liquid in the pouch to be pumped or otherwise metered by pumps 506 and valves 508 in precise ratios to form the desired product or beverage.

In some instances, other ingredients, components, or product or beverage forming additives can be inserted or otherwise operatively connected with the ingredient matrix 112. For instance, a carbonated water supply 114O, a sweetener 114P, and water supply 114Q can be operatively connected with the ingredient matrix 112. These ingredients, components, or product or beverage forming additives may be in the form of a pouch, or may be in another configuration suitable for access by the ingredient matrix 112.

In the examples of the carbonated water supply 114O and the water supply 114Q, a continuous supply of liquid like carbonated water, water and/or other continuous ingredient supplies can be provided by a combination of pumps 506, valves 508, and/or variable orifice regulators to meter and/or control the flow of liquid, carbonated water, water, or other ingredient supplies during the formation of the product or beverage. In a continuous supply example, the carbonated water supply 114O and the water supply 114Q can be connected to the ingredient matrix 112.

In one example, sweetener 114P can be a non-nutritive sweetener (NNS), high fructose corn syrup (HFCS), or other types or kinds of sweetener as may be required and/or desired in a particular embodiment. In this example, the sweetener 114P can be a pouch capable of being connected to the ingredient matrix 112.

In one embodiment, some of the product forming ingredients 114 referred to as pungent can be limited to selected ingredient matrix 112 locations. In this regard, pungent ingredients are so strong that once a pungent ingredient is drawn through dispenser tubing in the product dispenser the tubing is permanently flavored and any fluids that passes through the tubing will be tainted with the pungent taste. As such, once a pungent ingredient is used in the matrix, it is desirable to limit the replacement and/or addition of other pungent ingredients to certain of the ingredient matrix locations to maintain a premium quality product or beverage.

Also in one embodiment, certain of the product forming ingredient packages may require agitation to keep the ingredient mixed. In these cases, the location of such ingredients in the ingredient matrix can be limited to ingredient matrix locations that can be agitated as may be required and/or desired in a particular embodiment.

Also in one embodiment, certain of the product forming ingredient packages 114 may require antimicrobial tubing and/or dispenser parts. These product forming ingredient packages 114 can include milk, dairy, soy, and/or other types and kinds of product forming ingredient packages. In these cases, the location of such ingredients in the ingredient matrix 112 may be limited to ingredient matrix locations that utilize the appropriate antimicrobial tubing and/or dispenser parts as may be required and/or desired in a particular embodiment.

In one embodiment, for the most part, there is a one-to-one relationship between a particular product forming ingredient package 114 and a pump 506 and/or valve 508. In a few cases it may be desirable to utilize more then one pump and/or valve on a single ingredient to be able to draw a higher volume of liquid from the package in a shorter period of time. One such ingredient in which it may be desirable to use more than one pump 506 and/or valve 508 to be able to draw a higher volume of liquid from the package 114 in a shorter period of time can be the sweetener 114P.

Figure 1B:
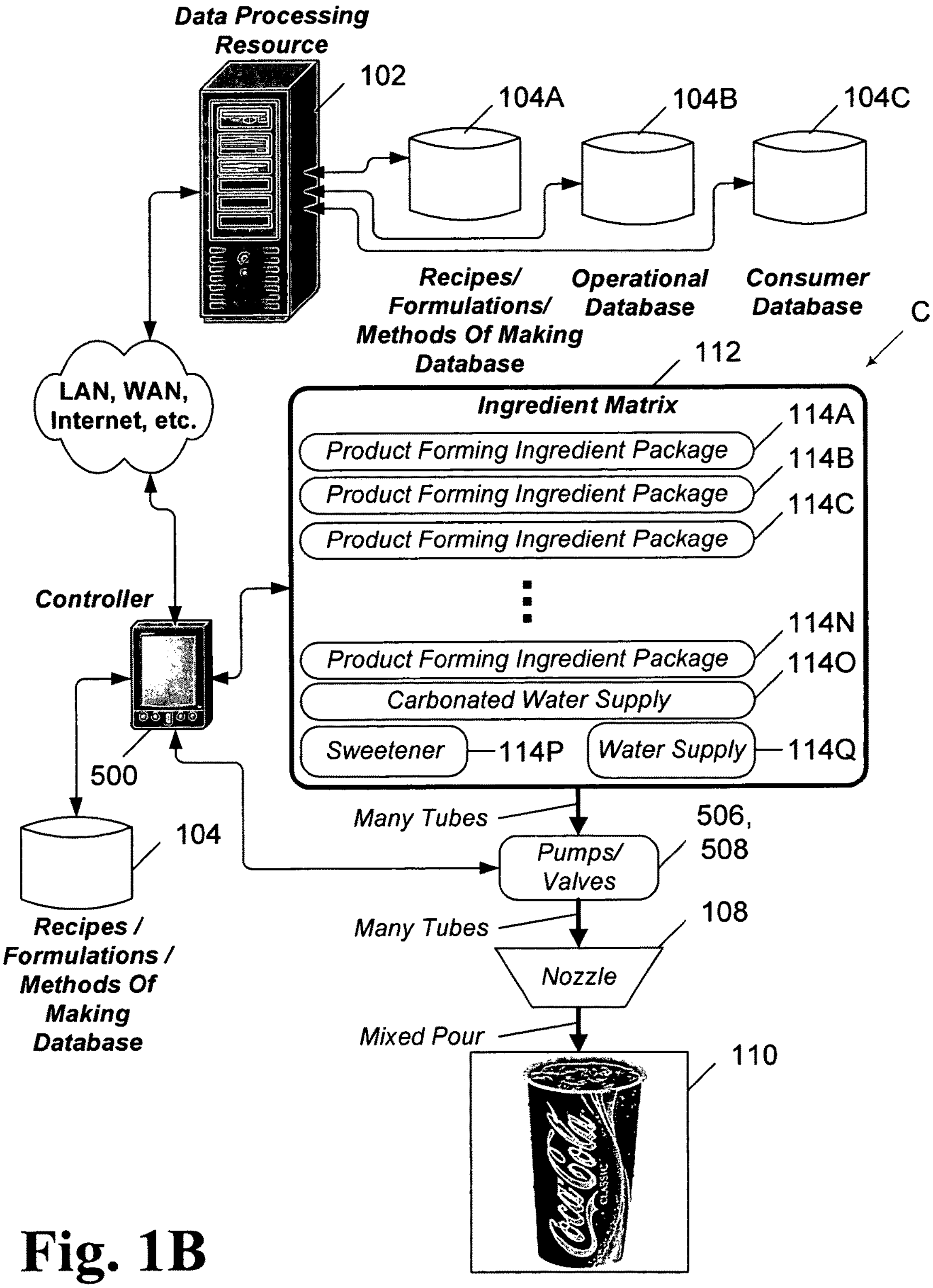
FIG. 1B illustrates one example of a product dispenser having a controller operationally related to an ingredient matrix and a network connection to a data processing resource in accordance with an embodiment of the invention.

Referring to FIG. 1B, there is illustrated one example of a product dispenser having a controller 500 operationally related to or connected to an ingredient matrix 112 and a network connection to a server or data processing resource 102. In one embodiment, a product dispenser which comprises a controller 500, optional database 104, ingredient matrix 112, a plurality of product forming ingredient packages 114, a plurality of pumps 506, a plurality of valves 508, and a nozzle 108 operationally related to form a product or beverage 110 can be networked via a network connection to the data processing resource 102, such as a server. Such a network connection can be facilitated by a network such as the Internet, a local area network (LAN), a wide area network (WAN), a LON WORKS network, and/or other types and kinds of networks or network connections as may be required and/or desired by a particular embodiment.

The data processing resource 102, such as a server, may be in communication with a plurality of databases such as recipes, formulations, and methods of making products or beverages database 104A, operational database 104B, and consumer database 104C. In addition, the data processing resource 102 can be used to aid or facilitate recipes, formulations, methods of making products or beverages, provide operational data processing, perform data processing related to consumer interaction, and/or perform other data processing as may be required and or desired in a particular embodiment. In this regard, the data processing resource 102 can aid or facilitate recipe formulation by downloading ingredient lists, formulation processes, flow rates and/or other information recipe formulation data as may be required and/or desired in a particular embodiment. Furthermore, data processing resource 102 can monitor operational characteristics such as pump performance and/or other operational characteristics. Such monitoring data can be used to adjust the method of making products or beverages, the ingredient ratios and/or concentrations, and/or for other purposes as may be required and/or desired in a particular embodiment.

In one embodiment, the data processing resource 102 can be utilized for consumer interaction. In this regard, payment for products or beverages, loyalty rewards, redemption, account management, promotions, consumer preference storage and retrieval, and/or other types and/or kinds of consumer interaction can be effectuated by way of data communication between the product dispenser and data processing resource 102. Such operational data processing can include, for example and not as a limitation, equipment status, maintenance, service alerts, predictive restock, and/or other types and kinds or operational data processing as may be required and/or desired in a particular embodiment.

Such consumer interaction support can include, for example and not as a limitation, consumer preferences, consumer product or beverage preferences, loyalty, gaming, prizes, media content, customizations, and/or other types and kinds of consumer interaction and/or data processing support as may be required and/or desired by a particular embodiment. In this regard, each consumer interaction with the product dispenser causes a product or beverage to be dispensed. Each product or beverage dispensed is formed by pumping ingredients in precise ratios, concentrations, and sequencing. Data related to these activities can be referred to as operational data. Such data can be data communicated to a data processing resource 102. At the data processing resource 102 the operational data can be analyzed to deduce operational and/or marketing data. Such marketing data can include, for example and not as a limitation, when, how, and what the consumer drank.

Such operational data can include data such as ingredient inventory levels and the rate at which ingredient are being utilized. This type of operational data can be useful in predictive supply and maintenance activities. In this regard, replacement ingredient outages can be anticipated and replacement ingredients can be shipped to the product dispenser so that sold out conditions can be minimized. Such operational information can also be used to schedule maintenance and service the product dispenser in a proactive manner. As an example, and not as a limitation, pumps and valves can be tracked one dispensed product or beverage at a time. When useful service life is near or performance degradation is detected a service technical can be sent to the dispenser with precise work order on what need to be serviced. In some embodiments, databases 104, 104A, 104B, and 104C are collectively or otherwise individually referred to herein as database 104.

In one embodiment, consumer interaction support can include, for example and not a limitation, a consumer receiving loyalty rewards when they use the product dispenser. In this regard, a MYCOKEREWARDS™ account and/or other types and/or kinds of loyalty accounts can be utilized to accrue and/or redeem loyalty rewards when the consumer utilizes the product dispenser.

In another embodiment, should a consumer attempt to use a product dispenser and determine that their first choice is unavailable the product dispenser can inform the consumer of the next best options. The next best options can include, for example and not a limitation, informing the consumer of the location of another product dispenser that serves the same product or beverage, informing the consumer of another product or beverage selection that has similar or suitable flavor, nutraceutical value, or other comparable properties, and/or informing the consumer of other options as may be required and/or desired in a particular embodiment.

In another embodiment, a frequent drinks program enables consumers to acquire frequent drink rewards and then redeem such rewards for free products or beverages dispensed from the product dispenser.

In another embodiment, consumers can signup to be notified when a new product or beverage formulation is available. In this regard, the product dispenser can be configured with the new product or beverage formulating ingredients and then prevented from dispensing such new product or beverage formulation until a specified date and/or time. The signed up consumers can be notified when and/or where the new product or beverage formulation will be made available. In addition, in certain promotions a very important person (VIP) code can be provide as part of a promotion to at least some of the signed up consumers. At the designated date, time, and location the signed up consumers can then be allowed to interact with the product dispensers being the first group the consumers to be able to try the new product or beverage formulation.

In another embodiment, consumer preferences can allow a consumer to specify his or her interests. Then when the product dispenser identifies the consumer such preferences and/or interests can be used to customize content for the product dispenser graphical user interface display. In this regard, for example and not limitation, if the consumer is interested in baseball the graphical user interface can be skinned in a baseball theme. If the consumer likes NASCAR™ racing then the user interface can be skinned in a NASCAR™ racing theme and news, weather, and sports information related to NASCAR™ racing can be obtained and used to populate and customize the graphical user interface screen. In some embodiments skinning is the process of customizing a portion of the graphical user interface to provide color, graphics, and content based theme. Such skinning can be to reflect, for example and not a limitation, MCDONALD'S™ colors and trademarks, COCA-COLA™ colors and trademarks, THE ATLANTA BRAVES™ baseball team colors and trademarks, and/or in general all types and kinds of organizations colors, graphics, and trademarks as may be required and/or desired in a particular embodiment.

In another embodiment, a consumer can utilize encoded media to configure the product dispenser with a recipe profile. In this regard, a consumer can carry with them a recipe profile and data communicate the recipe profile to a product dispenser, wherein the product dispenser is the configured with the consumer's recipe profile. Such a recipe profile can enable the consumer to determine and select product or beverage that the consumer has previously formulated and stored in the recipe profile. In addition, the consumer can add products or beverages once formulated to his or her recipe profile and store the recipe profile on the encoded media.

In another embodiment, a consumer can user a consumer specific code to save and retrieve a product or beverage recipe list. In this regard, the consumer can access a stored product or beverage recipe list by providing a consumer provided code. Once the list is retrieved the consumer can select product or beverage recipe from the list to be dispensed and/or add product or beverage formulations to the list.

In another embodiment, a promotional list of products or beverages can be offered to a consumer. Each of the promotional products or beverages can have a promotional association. In this regard, for example and not a limitation, a product or beverage can be associated with a school, organization, charity, and/or other types and/or kinds of promotional associations. When a consumer selects the promotional product or beverage the associated promotional association can receive a reward. Such reward might be monetary and/or other types and/or kinds of rewards, as may be required and/or desired by a particular embodiment. This can allow a promotional association to receive rewards each time a consumer elects to dispense their associated product or beverage from the product dispenser.

In another embodiment, a consumer can be prompted to add-on a game code or ring tone at the time a product or beverage is dispensed. In this regard, the consumer can elect to receive a game code that can be used on a video game for players advantage, and/or acquire a ring tone that can be utilized on a wireless device.

Figure 1C:
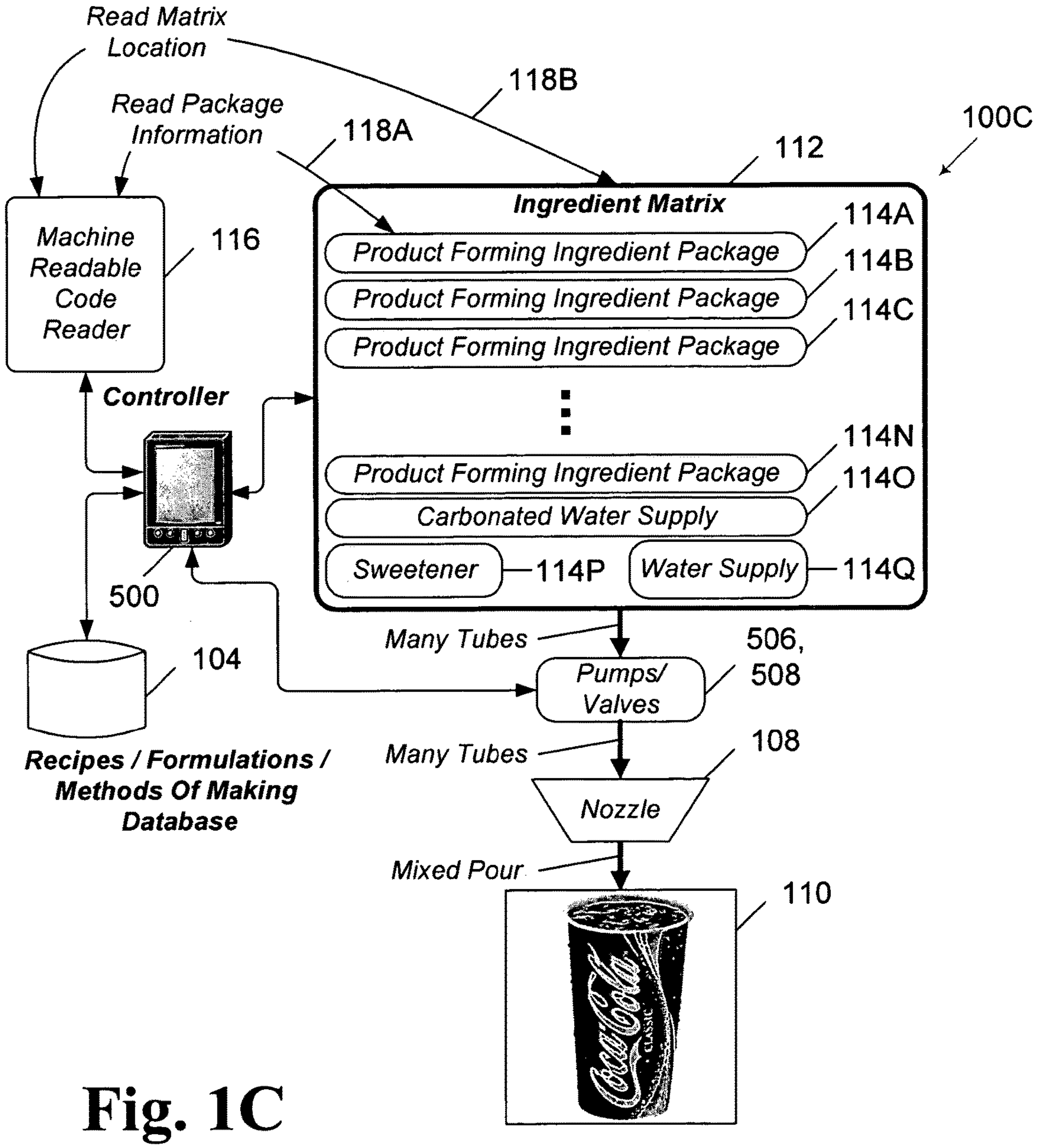
FIG. 1C illustrates one example of a product dispenser having a controller operationally related to an ingredient matrix and a machine readable code reader in accordance with an embodiment of the invention.

Referring to FIG. 1C, there is illustrated one example of a product dispenser having a controller 500 operationally related to or connected to an ingredient matrix 112 and a machine readable code reader 116, such as a bar code, RFID, reflected light frequency, optical, etc. In one embodiment, a machine readable code reader 116 can be utilized to scan or read the product forming ingredient packages 114A-114Q prior to insertion into the ingredient matrix 112. In this regard, the controller 500 can be used to obtain information related to or associated with the product forming ingredient package, such as 114A, using information from the scan or read, and use such information to identify within the ingredient matrix 112 an optimum matrix location for placement of the product forming ingredient package. For example, data from a product forming ingredient package 114A, such as a serial number or identification code, can be utilized alone or correlated with previously stored information in a database, such as 104, or with data otherwise accessible or stored by data processing resource 102, which may identify one or more ingredients associated with the product forming ingredient package 114A. In another example, data from a product forming ingredient package 114A, such as a ingredient code or identifier, can be utilized alone or correlated with previously stored information in a database, such as 104, or with data otherwise accessible or stored by data processing resource 102, which may identify one or more ingredients associated with the product forming ingredient package 114A. In another example, product forming ingredient packages, such as 114A-114Q, can be color coded or otherwise mechanically coded to identify one or more ingredients associated with each product forming ingredient package, such as 114A-114Q.

Figure 2A:
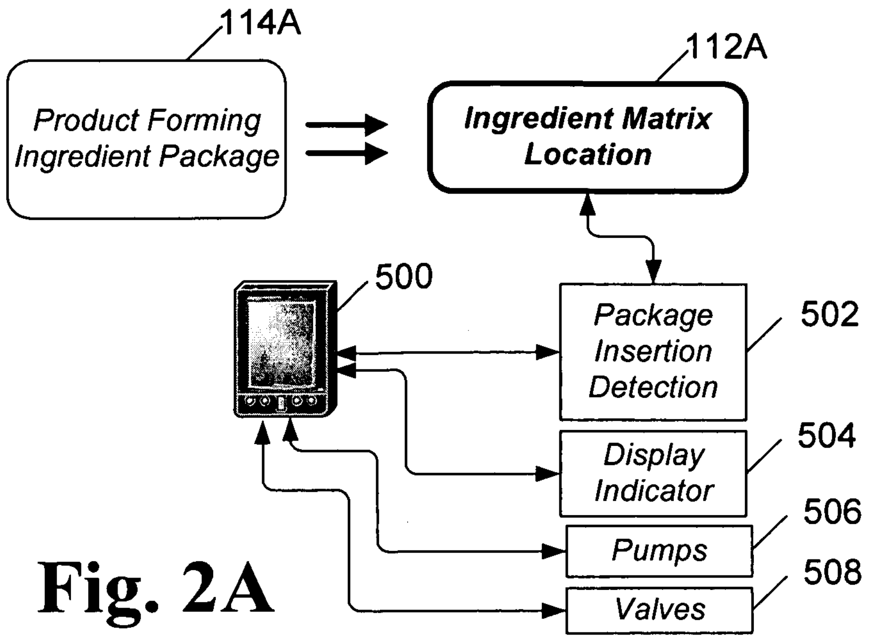
FIG. 2A illustrates one example of an operational relationship between a controller 500 and an ingredient matrix location 112A within an ingredient matrix 112 in accordance with an embodiment of the invention.

In addition, as product forming ingredient packages 114A-114Q are scanned and an optimum matrix location identified, package installation personnel can be informed where a particular product forming ingredient package 114A is to be located in the ingredient matrix 112 by way of an output device such as a light emitting diode (LED) display indicator 504, shown in FIG. 2A, and/or informed by way of other types and kinds of output devices or display indicators as may be required and/or desired in a particular embodiment. Other embodiments can include output devices such as LCD screens, input/output (I/O) interfaces, and audio interfaces.

In one embodiment, correct product forming ingredient package 114 insertion into the ingredient matrix 112 can be double checked or otherwise verified by scanning a machine readable code on the package (illustrated as 118A) and scanning a machine readable code located on the ingredient matrix 112 at the point of insertion (illustrated as 118B). In this regard, the controller 500 can then check or verify that the product forming ingredient package 114 is correctly located in the ingredient matrix 112.

Figure 1D:
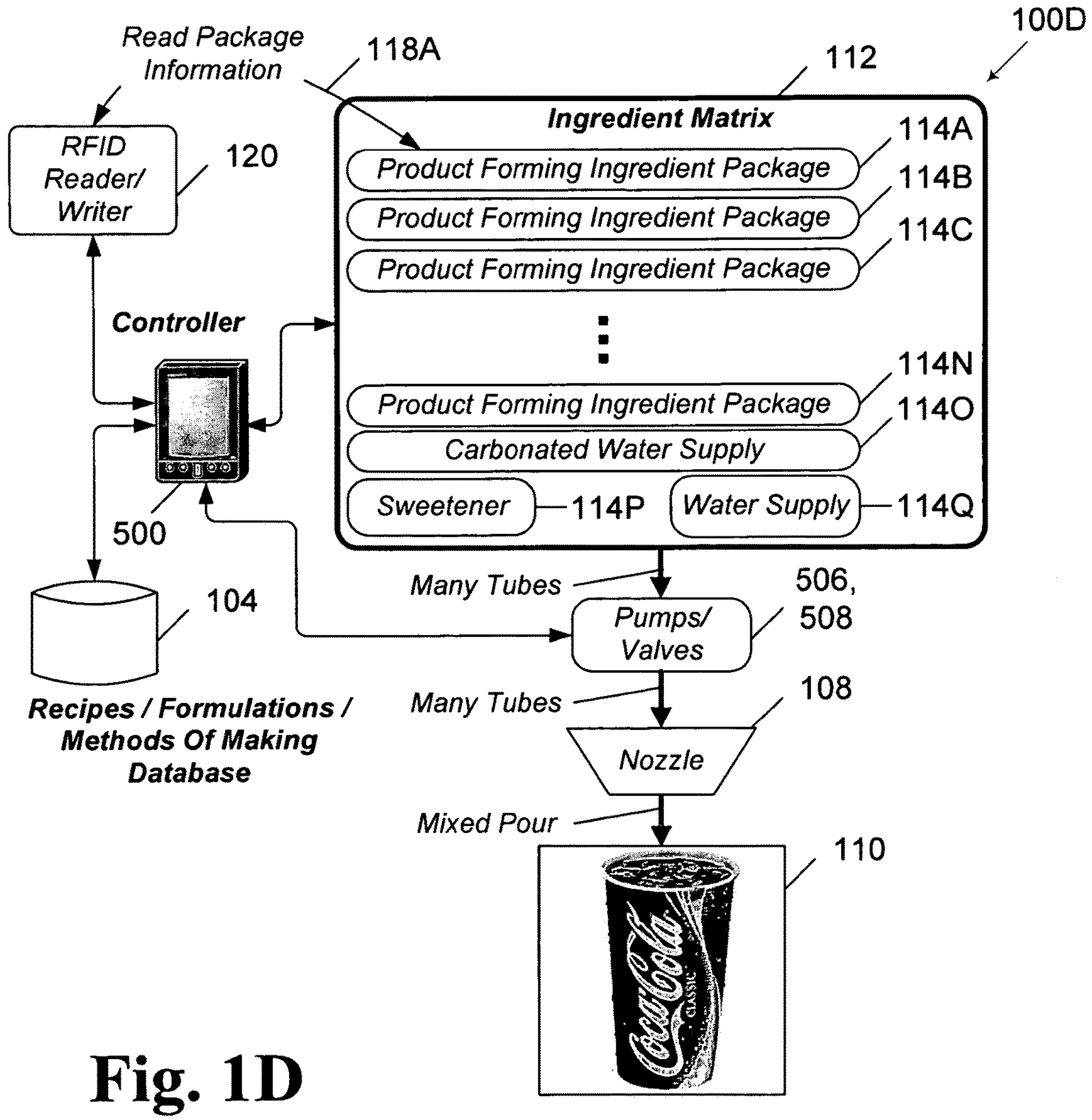
FIG. 1D illustrates one example of a product dispenser having a controller operationally related to an ingredient matrix and a radio frequency identification (RFID) reader in accordance with an embodiment of the invention.

Referring to FIG. 1D, there is illustrated one example of a product dispenser having a controller 500 operationally related to an ingredient matrix 112 and one type of a machine readable code reader, such as a radio frequency identification (RFID) reader 120. In one embodiment, an RFID reader 120 can be utilized to read an RFID tag (illustrated as 118A) associated with the product forming ingredient packages 114A prior to their insertion into the ingredient matrix 112. In this regard, the controller 500 can be used to obtain information related to or associated with the product forming ingredient package 114, and use such information to identify or otherwise determine within the ingredient matrix 112 an optimum or desired matrix location for placement of the product forming ingredient package 114. In addition, as product forming ingredient packages are scanned and an optimum or desired matrix location is identified, package installation personnel can be informed where the product forming ingredient package 114 is to be located in the ingredient matrix 112 by way of an output device such as light emitting diode (LED) display indicator 504, shown in FIG. 2A, and/or informed by way of other types and kinds of output devices or display indicators as may be required and/or desired in a particular embodiment. Other embodiments can include output devices such as LCD screens, input/output (I/O) interfaces, and audio interfaces.

Furthermore, in one embodiment, a RFID tag associated with a product forming ingredient package, such as 114A, can be written to and/or modified such that the product forming ingredient package 114A is prevented or otherwise limited from being inserted into a second or other product dispenser. In this regard, should service personnel attempt to read the RFID tag a second time in an attempt to relocate the package 114A into a second product dispenser it would be known to a controller associated with the second product dispenser that the package 114A has previously been inserted into a different product dispenser, and as such, would not allow the package 114A to be operated in a second ingredient matrix. In operation, this can prevent partially used product forming ingredient packages from being transferred between product dispensers.

Figure 1E:
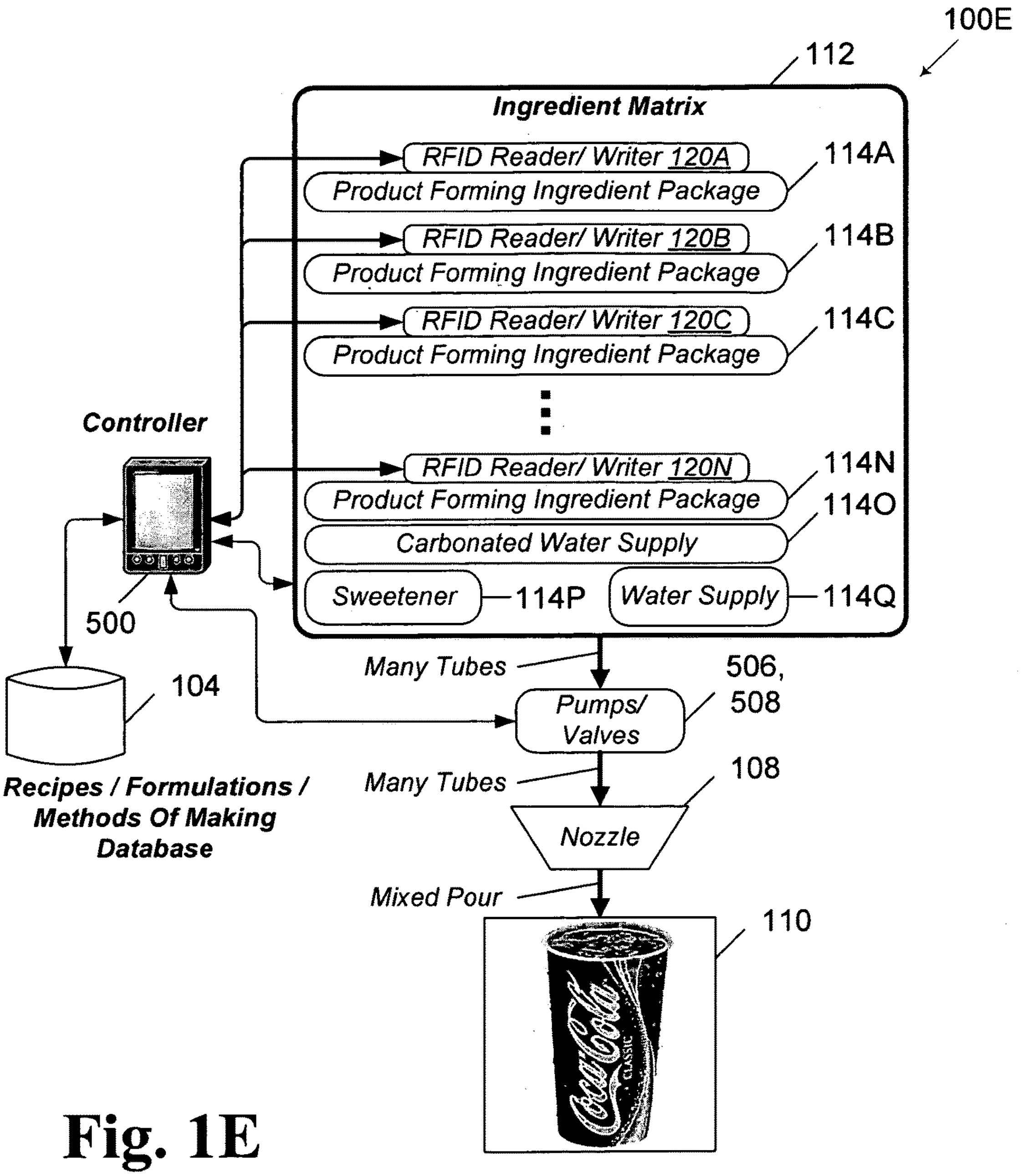
FIG. 1E illustrates one example of a product dispenser having a controller operationally related to an RFID enabled ingredient matrix in accordance with an embodiment of the invention.

Referring to FIG. 1E, there is illustrated one example of a product dispenser having a controller 500 operationally related to a RFID enabled ingredient matrix, shown here as 112. In one embodiment, a RFID reader/writer, such as 120A, can be associated with each insertion location within the ingredient matrix 112. In this regard, as a product forming ingredient package, such as 114A, is inserted into the ingredient matrix 112, a unique RFID reader/writer, such as 120A, can be associated with each respective ingredient matrix 112 insertion location, and can read and/or write to the respective product forming ingredient package, such as 114A.

Illustrated in FIG. 1E is how one embodiment of a RFID reader/writer 120A can be located adjacent to an insertion location within an ingredient matrix 112 where a particular product forming ingredient package, such as 114A, is to be inserted. As such, a RFID reader/writer 120B can be associated with an insertion location for package 114B, and similarly 120C can be associated with 114C, continuing through the total number 'N' of insertion locations and packages represented as 120N and 114N respectively. In one embodiment, there can be forty four (44) RFID reader/writers 120A-120N associated with product forming ingredient packages 114A-114N though not all ingredients such as, for example and not as a limitation, carbonated water 114O, sweetener 114P, and water 114Q, may have respective RFID reader/writers. In some embodiments, a RFID reader/writer 120A-120N can be referred to as RFID reader/writer 120 or RFID reader 120, and 'N' represents the total number of objects such as packages 114N or RFID readers/writers 120N. In one embodiment 'N' can be any number, and in another embodiment can be a number in fewer than or in excess of forty four (44).

In one embodiment, a RFID reader 120 can be utilized to read an RFID tag associated with a product forming ingredient package, such as 114A, upon insertion of the package 114A into the ingredient matrix 112. In this regard, the controller 500 can be used to obtain information related to or associated with the product forming ingredient package 114A. Such information can be used to identify within the ingredient matrix 112 an optimum or desired matrix location for placement of the product forming ingredient package 114A. In this regard, information related to the product forming ingredient package 114A can be manually entered into the controller 500 such that an optimum or desired matrix location can be identified. Once identified, a service personnel can be informed of the optimum or desired location within the ingredient matrix 112 by way of one of the output devices such as light emitting diode (LED) display indicators 504, shown in FIG. 2A, and/or informed by way of other types and kinds of output devices or display indicators as may be required and/or desired in a particular embodiment. Other embodiments can include output devices such as LCD screens, input/output (I/O) interfaces, and audio interfaces.

Furthermore, in one embodiment, a RFID tag associated with a product forming ingredient package, such as 114A, can be written to and/or modified such that the product forming ingredient package 114A is prevented or otherwise limited from being utilized by a second or other product dispenser. In this regard, should service personnel attempt to read the RFID tag a second time in an attempt to relocate the package into a second product dispenser it would be known to a second controller, via tag information or a network component, that the package has previously been inserted into a different product dispenser and as such would not allow the package to be operated in a second ingredient matrix. In operation, this can prevent or otherwise limit partially used packages from being transferred between product dispensers by way of determining via tag information or a network component the amount of an ingredient remaining within a particular product forming ingredient package.

In one embodiment, information associated with an amount of an ingredient remaining in a product forming ingredient package 114 can be written to a RFID tag associated with a product forming ingredient package, such as 114A. Such information can be written to the RFID tag after each use or prior to removal of the product forming ingredient package 114A from the ingredient matrix 112.

In other embodiments, machine readable code readers, read/write-type devices, RFID readers, and/or optical-type reader devices can be used with the ingredient matrix 112 described in FIG. 1E. That is, machine readable code readers, read/write-type devices, RFID readers, and/or optical-type reader devices can be located at insertion locations, such as 120A, within the ingredient matrix 112 where product forming ingredient packages, such as 114A, are to be inserted. As such, machine readable code readers, read/write-type devices, RFID readers, and/or optical-type reader devices can be associated with an insertion location 120B for package 114B, and similarly can be associated with insertion location 120C for package 114C, continuing through the total number 'N' of insertion locations and packages represented as 120N and 114N respectively. In one embodiment, there can be forty four (44) machine readable code readers, read/write-type devices, RFID readers, and/or optical-type reader devices associated with product forming ingredient packages 114A-114N though not all ingredients such as, for example and not as a limitation, carbonated water 114O, sweetener 114P, and water 114Q, may have respective machine readable code readers, read/write-type devices, RFID readers, and/or optical-type reader devices. In one embodiment 'N' can be any number, and in another embodiment can be a number in excess of forty four (44).

Figure 1F:
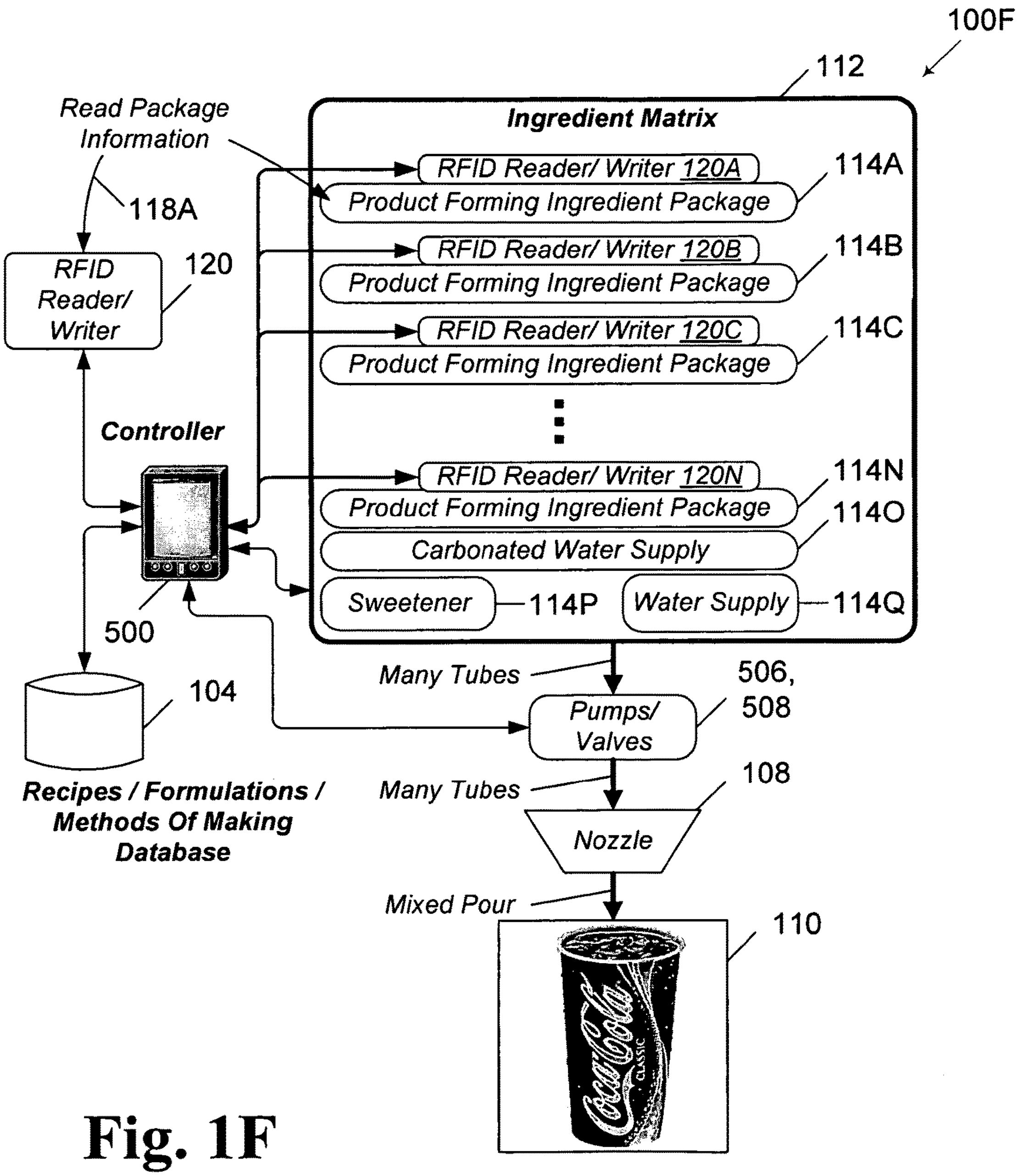
FIG. 1F illustrates one example of a product dispenser having a controller operationally related to an RFID enabled ingredient matrix and a RFID reader/writer in accordance with an embodiment of the invention.

Referring to FIG. 1F, there is illustrated one example of a product dispenser having a controller 500 operationally related to an RFID enabled ingredient matrix, shown as 112, and a RFID reader/writer 120. In one embodiment, techniques of FIGS. 1D and 1E can be combined to obtain information related to or associated with a particular product forming ingredient package, such as 114A, by way of RFID reader/writer 120, such as 120A, identify or otherwise determine within the ingredient matrix an optimum or desired matrix location for the package, inform service personnel by way of display or other way of the correct, optimum, or desired location for the package 114A, and verify the correct, optimum, or desired insertion of the package 114A by way of RFID reader/writer 120A-120N.

Furthermore, in one embodiment, a RFID tag associated with a product forming ingredient package, such as 114A, can be written to and/or modified such that the product forming ingredient package 114A is prevented from being utilized by a second or other product dispenser. In this regard, should service personnel attempt to read the RFID tag a second time in an attempt to relocate the package into a second product dispenser it would be known to a second controller, via tag information or a network component, that the package has previously been inserted into a different product dispenser and as such would not allow the package to be operated in a second ingredient matrix. In operation, this can prevent partially used packages from being transferred between product dispensers by way of determining via tag information or a network component the amount of an ingredient remaining within a particular product forming ingredient package.

Referring to FIG. 2A, there is illustrated one example of an operational relationship between a controller 500 and an ingredient matrix location 112A within an ingredient matrix 112. In one embodiment, a product forming ingredient package 114A can be inserted into an ingredient matrix location 112A. In operation, there can be dozens of individual packages 114A-114N which can be uniquely inserted into dozens of ingredient matrix locations 112. In this regard, each of the packages 114A-114N can be metered, pumped, and monitored to form products or beverages. FIG. 2A illustrates one such embodiment of one of the many package matrix location operational relationships. In a plurality of embodiments the operational relationship depicted in FIG. 2A would be replicated many times in accordance with the size and number of ingredient matrix locations.

In one embodiment, package 114A is inserted into ingredient matrix location 112A. To meter, pump, and monitor ingredient contents, a controller 500 is operationally related to a package insertion detection interface 502, display indicator 504, pumps 506, and/or valves 508. In a plurality of embodiments, a combination of some or all of these and other features can be used as may be required and/or desired in a particular embodiment. As such, some embodiments may have less than all of the illustrated features while some may have more. As an example and not as a limitation, valves 508 might not be required for each of the packages 114A-114N inserted in certain of the matrix locations 112A-112N. As such, if a valve 508 is not needed in the embodiment, the embodiment can be effectuated without valve 508. This adding and/or subtracting of features for a matrix location configuration can apply for each of the features illustrated in the Figure and can vary as may be required and/or desired in a particular embodiment.

In operation, the package insertion detection interface 502 can be a limit switch, Hall Effect sensor, optical, and/or other types and kinds of package insertion detection interfaces as may be required and/or desired by a particular embodiment. In any instance, a package insertion detection interface 502 can be used to detect the insertion of package, such as 114A, into a respective or particular ingredient matrix location, such as 112A.

Figure 2B:
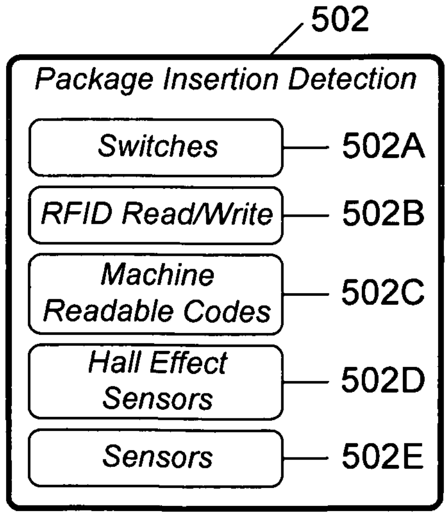
FIG. 2B illustrates one example of a plurality of package insertion detection interfaces in accordance with an embodiment of the invention.

Referring to FIG. 2B, there is illustrated one example of a plurality of package insertion detection interfaces 502. Such interfaces 502 can include, for example and not limitation, as required and/or desired by a particular embodiment, switches 502A, RFID reader/writer 502B (also referred to as RFID reader as shown in FIGS. 1E and 1F as 120), machine readable code reader 502C (also referred to as machine readable code reader in FIG. 1C as 116), Hall Effect sensors 502D, and/or sensors 502E. In some embodiments, RFID reader/writer 502B, machine readable code reader 502C, and manually entered information and data related to a product forming ingredient package, such as 114A, can be referred to as an ingredient package identifier.

Display indicator interface 504 in FIG. 2A can be a user interface or an output device such as a light emitting diode (LED) display interface, other display interface, or type of indicator or output device as may be required and/or desired in a particular embodiment. In operation, interface 504 can be utilized to direct service personnel to matrix locations and/or inform service personnel of certain operational status, operational condition, and/or utilized, for other purposes, as may be required and/or desired in a particular embodiment.

For example, as needed, one or more pumps 506 can be utilized to pump ingredient contents from a particular package, such as 114A, once the package 114A has been correctly or suitably inserted into a respective matrix location, such as 112A, as may be required and/or desired in a particular embodiment In addition, as needed, one or more valves 508 can be utilized to meter the flow of ingredients from a respective package, such as 114A, from a respective matrix location, such as 112A, or from the ingredient matrix, such as 112, during product or beverage formation as required and/or desired in a particular embodiment.

Figure 2C:
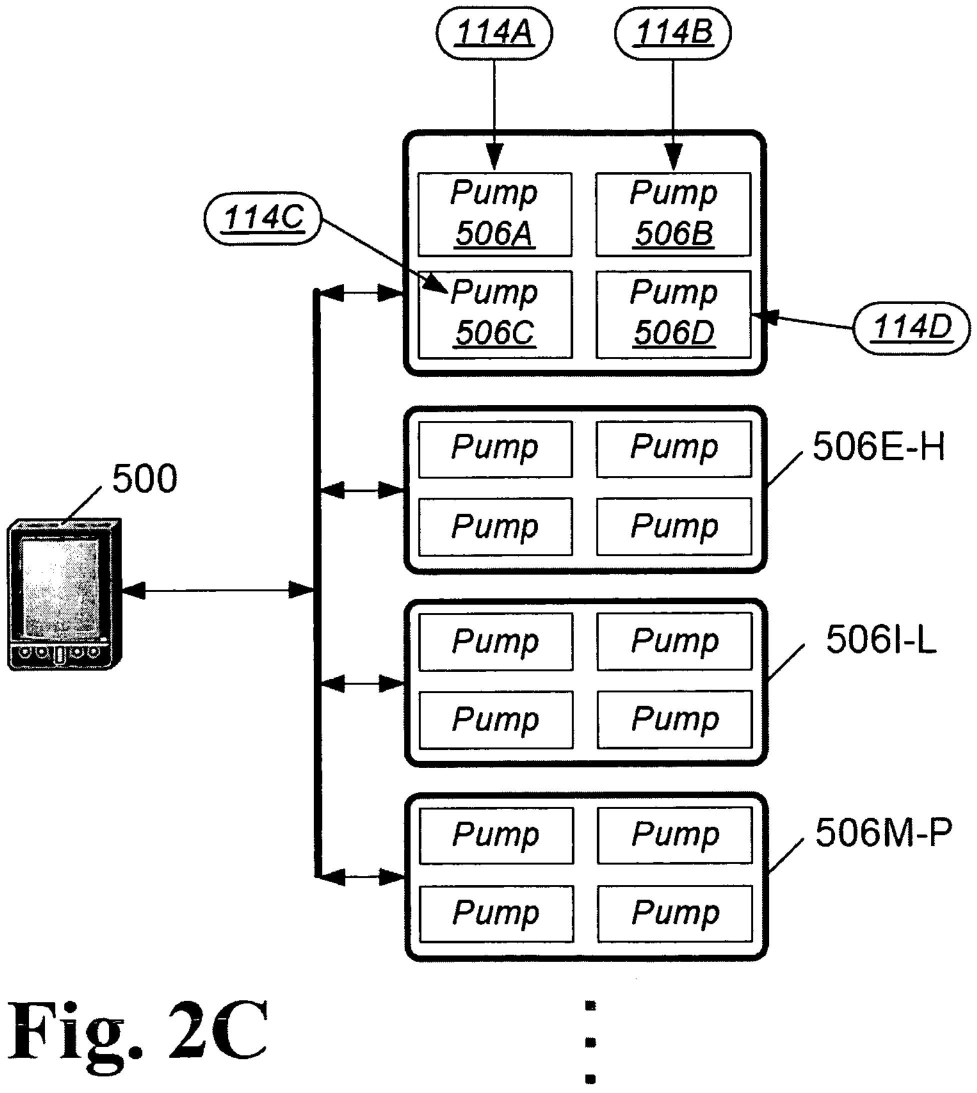
FIG. 2C illustrates one example of a plurality of product forming ingredient packages being associated with a plurality of pumps in accordance with an embodiment of the invention.

Referring to FIG. 2C, there is illustrated one example of a plurality of product forming ingredient packages being associated with a plurality of pumps. In one embodiment, a plurality of pumps, such as 506A-506P, can be operationally related to a controller, such as 500. Additionally, a plurality of product forming ingredient packages, such as 114A-114D, can be associated with some or all of the plurality of pumps, such as 506A-506D. In operation, controller 500 can create an association between the plurality of product forming ingredient packages 114A-114D and the pumps 506A-D and/or valves, shown as 508 in FIG. 2A. This association can be stored as a last known good association such that each time the product dispenser is powered up and/or reset, a check for conflicts of the current association between the plurality of product forming ingredient packages and the pumps can be made. Such conflicts can include, for example and not as a limitation, a pungent product forming ingredient package being incorrectly located in the ingredient matrix, an agitation required product forming ingredient package being located in a non-agitated ingredient matrix location, at least two product forming ingredient packages being age and/or otherwise incompatible, and/or other types and kinds of conflicts, monitoring, and determination as may be required and or desired in a particular embodiment.

In one embodiment, as related to a service technician making repairs or a service person restocking the product dispenser, product forming ingredient packages and pumps can from time to time be removed, replaced, exchanged, or in other ways the dispenser and ingredients modified. In these conditions, it may be likely that product forming ingredient packages are moved to different slots and/or pump/valve assemblies are changed. As such, when the product dispenser is next powered up or reset only then will the changes be determinable and of operational consequence. For example and not as a limitation, if there is a product forming ingredient package in the incorrect or an unsuitable ingredient matrix location, the incorrect recipe may be poured. In addition, a replacement pump associated with an incorrect or unsuitable product forming ingredient package can cause the ratio of the pour to be incorrect, resulting in poor product or beverage quality and/or taste. In this regard, often different ingredients have different viscosities. Furthermore, as viscosity of the ingredients change, from ingredient to ingredient, various characteristics of the pumps have to changed or otherwise adjusted in order to deliver the correct or suitable ingredient at a suitable ratio per the recipe.

Characteristics can be referred to herein as operational characteristics and can include, for example and not as a limitation, electrical and/or mechanical characteristics of at least one of the pumps to control or compensate for a viscosity of a particular ingredient being pumped.

An advantage of an embodiment of the invention is that once a known good association exists, the dispenser can obtain information related to a plurality of product forming ingredient packages located in the ingredient matrix, determine an association related to the operational relationship between each of the plurality of product forming ingredient packages and each of a plurality of pumps, determine if the association has changed by comparison to the last known good association, and modify the association if the association has changed to accommodate the new association.

In addition, another advantage of an embodiment of the invention can be that the plurality of said product forming ingredient packages configured within the ingredient matrix can be compared to a database of product or beverage recipes to form an available product or beverage menu.

Referring to FIG. 2C, there is illustrated a controller 500 operationally related to a plurality of pumps 506A-P. In addition, there is an association made between the pumps 506A-D and a plurality of product forming ingredient packages 114A-D. In this regard, package 114A can be associated with pump 506A, package 114B can be associated with pump 506B, package 114C can be associated with pump 506C, and package 114D can be associated with pump 114D. In one embodiment, an association between any number of pumps 506A-P and packages 114A-D can be determined and stored as a last known good association. On power up or reset the plurality of packages 114 are checked to determine whether the association with the plurality of pumps has changed (as compared the last known good association). If the association has changed, the controller attempts to dynamically reconfigure the pumps and packages association. If there are no conflicts, the association is updated and stored as the last known good association, and the system starts normally. In there are conflicts then one or more prompting and attention may be needed or required before normal dispenser operation can resume.

Figure 2D:
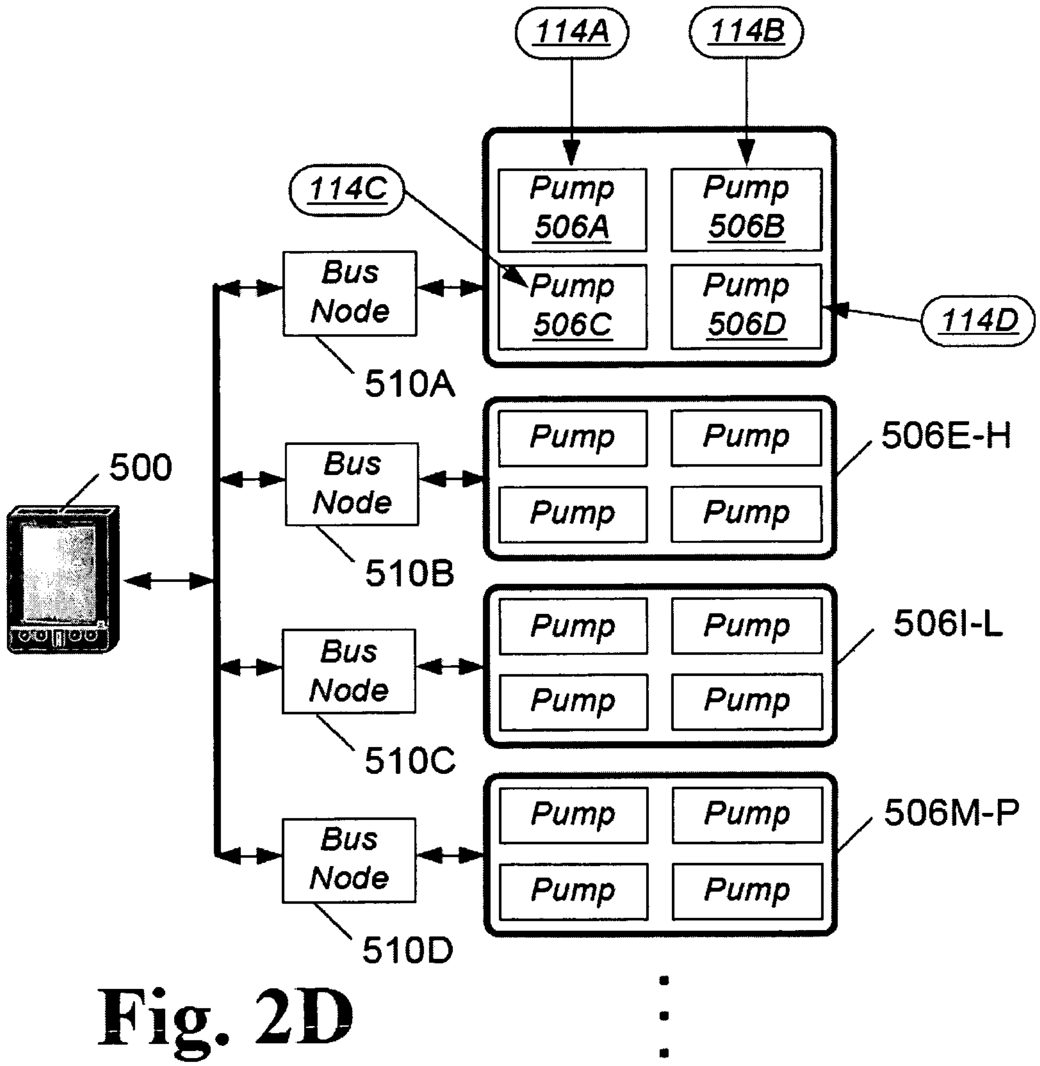
FIG. 2D illustrates one example of a plurality of product-product forming ingredient packages being associated with a plurality of pumps and interfaced to a controller by way of a plurality of bus nodes in accordance with an embodiment of the invention.

Referring to FIG. 2D, there is illustrated one example of a plurality of product forming ingredient packages 114A-114D being associated with a plurality of pumps 506A-D, and interfaced to a controller 500 by way of one or more of a plurality of bus nodes, such as 510A. In one embodiment, a plurality of bus nodes 510A-510D can be utilized to interface a plurality of pumps/valves 506A-506P, 508 (shown in FIG. 2A) to a network bus. In this regard, the bus can be a relatively more efficient way for a controller 500 to data communicate and/or control the pumps/valves 506A-506P, 508. In one embodiment, the bus node 510A-510D can effectuate embedded microcontroller functionality and/or be a network interface device effectuating network communications between controllers and devices such as pumps/valves 506A-506P, 508 and/or other types and kinds of devices as may be required and or desired in a particular embodiment. Such network communications can include CAN, OPEN CAN, RS232, ETHERNET, RS485, wired, wireless, and/or other types and kinds of bus node effectuated network communications as may be required and or desired in a particular embodiment.

An advantage of an embodiment of the invention can be that that once a known good association exists, the dispenser can obtain information related to a plurality of product forming ingredient packages located in the ingredient matrix, determine an association related to the operational relationship between each of the plurality of product forming ingredient packages, each of a plurality of pumps, each of the plurality of bus nodes 510A-510D, determine if the association has changed by comparison to the last known good association, and modify if the association has changed, the product dispenser to accommodate the new association. In this regard, if a bus node is replaced or relocated in the ingredient matrix, the last known good association can be utilized to detect, resolve conflicts, and/or update a new association as may be required and/or desired in a particular embodiment.

Figure 3:
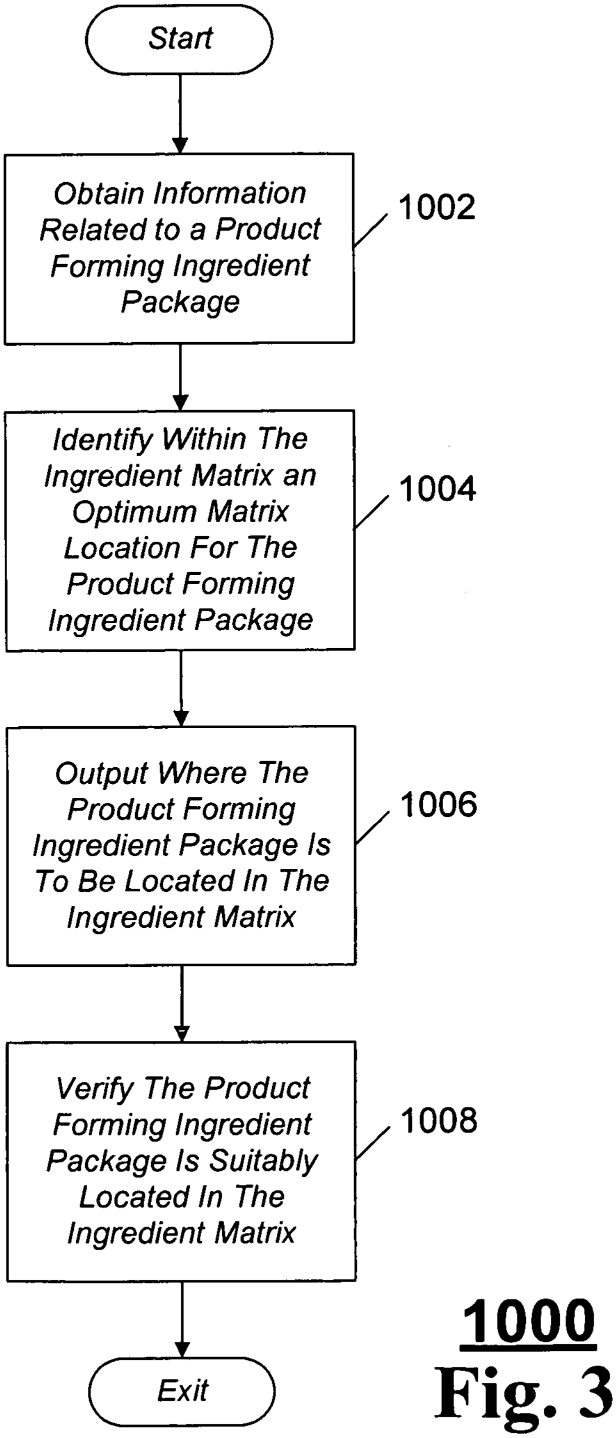
FIG. 3 illustrates one example of a method of managing an ingredient matrix to optimize product quality in accordance with an embodiment of the invention.

Referring to FIG. 3, there is illustrated one example of a method 1000 of managing an ingredient matrix 112 to optimize product or beverage quality. In one embodiment, managing an ingredient matrix 112 includes obtaining information about a plurality of product forming ingredient packages 114, identifying an optimum matrix location to insert each of the packages, informing a service personnel where to insert or locate the package within the matrix, and verify the package was inserted correctly. In operation, unsuitable placement of a single ingredient package 114 can cause product or beverage quality to be to be compromised. Incorrect or unsuitable insertion can cause product or beverage quality problems and dispenser issues including a wrong recipe pour, a misplaced pungent ingredient (which can ruin the dispenser), an ingredient that requires agitation being misplaced into a non-agitation matrix location causing unmixed ingredients to be dispensed, and/or other types and kinds of product or beverage quality problems can occur. The method 1000 begins in block 1002.

In block 1002, information is obtained related to or associated with a product forming ingredient package. Such information can include, for example and not as a limitation, a package SKU or identification number, a lot number, package description, expiration or product compromised date, and/or other types and kinds of information as may be required and/or desired in a particular embodiment. Processing then moves to block 1004.

In block 1004, an optimum matrix location is determined within the ingredient matrix for the product forming ingredient package 114. In this regard, consideration of brand product, non-brand product, ingredient compromise data, pungent, agitation, prior existence of similar product, and/or other types and kinds of considerations referred to as insertion rules and/or insertion guidelines as required and/or desired in a particular embodiment can be consider to determine the optimum matrix location for the product forming ingredient package. Processing then moves to block 1006.

In block 1006, service personnel can be informed of the optimum matrix location to insert the product forming ingredient package 114. As may be required and/or desired in a particular embodiment an output device such as a LED display, controller 500 display and/or other types and kinds of displays can be used to inform or otherwise output where the product forming ingredient package 114 is to be located in the ingredient matrix 112. Processing then moves to block 1008.

In block 1008, the product forming ingredient package 114 location is verified to insure correct location in the ingredient matrix 112. In this regard, a check is made to see that the product forming ingredient package 114 was inserted into the correct ingredient matrix 112 location.

The method 1000 ends at block 1008.

Referring to FIG. 4, there is illustrated one example of a method 2000 of applying one or more insertion rules to determine the correct location to place a product forming ingredient package 114 within an ingredient matrix 112. In one embodiment, the method can include application of any number of insertion guidelines and/or rules. Such insertion rules and/or guidelines can include, but are not limited to, consideration of brand product, non-brand product, ingredient compromise data, pungent requirements, agitation requirements, prior existence of similar product, replacement of semi empty packages, and/or other types and kinds of considerations referred to as insertion rules and/or insertion guidelines as required and/or desired in a particular embodiment to determine an optimum or desired matrix location for a product forming ingredient package. The method 2000 begins in block 2002.

In block 2002, one or more insertion rules and/or insertion guidelines are applied to the current product forming ingredient package insertion request. Such insertion rules and guidelines can be used to limit the location of certain ingredients to certain locations in the ingredient matrix 112. In operation, there may be certain ingredients such as milk, soy, dairy, special handling ingredients, antimicrobial tubing requirements, and/or other type and kinds of insertion rule processing, necessary to insure correct location of the ingredient package 114 in the ingredient matrix 112.

In one embodiment, an insertion rule or guideline can include detection of an event associated with at least one of the product forming ingredient packages 114. For example, an event can include, but is not limited to, detection of an unsuitable product forming ingredient package; detection of a product forming ingredient package not associated with at least one previously stored beverage recipe; detection of an incorrect installation of a product forming ingredient package; removal of a product forming ingredient package, expiration of an ingredient in a product forming ingredient package, and replacement of a particular product forming ingredient package. In response to a detected event, the method 2000 can execute an appropriate action. Examples of appropriate actions are described as follows.

Block 2002 is followed by decision block 2004. In decision block 2004, a determination is made as to whether the ingredient requested is to be inserted into the matrix 112 as part of any known recipes in at least one database. If the resultant determination affirms that the ingredient is in at least one of the recipes in at least one database, processing continues to decision block 2008. If the resultant determination is negative, that is, the ingredient is not in any of the recipes in at least one database, processing continues to block 2006.

In block 2006, an alarm notification is generated and the method 2000 ends.

In decision block 2008, a determination is made as to whether the ingredient is a pungent. If the resultant determination is affirmative, that is, the ingredient is a pungent, then the method 2000 continues to block 2010. If the resultant determination is negative, that is, the ingredient is not a pungent, then processing continues to decision block 2012.

In block 2010, possible ingredient matrix locations are limited to locations that have previously dispensed the same pungent ingredient or to locations that are not occupied or otherwise unallocated. Processing continues to decision block 2012.

In decision block 2012, a determination is made as to whether the ingredient requires agitation. If the resultant determination is affirmative, that is, the ingredient requires agitation, then processing continues at block 2014. If the resultant determination is negative, that is, the ingredient does not require agitation, then processing continues at decision block 2016.

In block 2014, possible ingredient matrix locations are limited to locations that have previously dispensed the same ingredient or to agitation capable locations that are not occupied or otherwise unallocated. Processing continues at decision block 2016.

In decision block 2016, a determination is made as to whether the ingredient insertion request is being made to add capacity. In this regard, if a particular recipe is an often dispensed recipe it may be desirable to add several of the same ingredients to allow more of the recipe to be dispensed between restock. As such, this can be referred to as adding capacity. If the resultant determination is affirmative, that is, the ingredient insertion request is for adding capacity, then processing continues at block 2018. If the resultant determination is negative, that is, capacity is not being added then processing continues at decision block 2020.

In block 2018, identification of possible ingredient matrix locations are limited to locations that that are not occupied or otherwise unallocated. If no such location is identified, then prompting to unallocate a suitable matrix location can be implemented. Processing continues at decision block 2020.

In decision block 2020, a determination is made as to whether or not an existing package is being replaced. If the resultant is in the affirmative that is an existing package is being replaced then processing moves to decision block 2022. If the resultant is in the negative that is an existing package in not being replaced then processing moves to block 2030.

In decision block 2022 a determination is made as to whether the existing package in the ingredient matrix is empty or nearly empty. If the resultant determination is affirmative, that is, the existing package in the matrix is empty or nearly empty, processing continues at block 2030. If the resultant determination is negative, that is, the existing package in the matrix is not empty or nearly empty, processing continues at block 2024.

In block 2024, a prompt is made that the current existing package in the ingredient matrix 112 does not need to be replaced. Processing continues at decision block 2026.

In decision block 2026, a determination is made as to whether the ingredient insertion request is being made to add capacity. If the resultant determination is affirmative, that is, the ingredient insertion request is adding capacity, processing returns to decision block 2016. If the resultant determination is negative, that is, capacity is not being added, processing continues at decision block 2028.

In decision block 2028, a determination is made as to whether replacement of the existing ingredient, which may not be to be necessary, is desired. If the resultant determination is affirmative, that is, replacement is desired anyway, processing continues at block 2030. If the resultant determination is negative, that is, replacement is not implements, and the method 2000 ends.

In block 2030, a prompt is made to replace and/or insert the product forming ingredient package at the determined optimum or desired matrix location. In one embodiment, once installed, the product forming ingredient package can be pumped to prime the ingredient as may be required and or desired in a particular embodiment. The method 2000 ends.

In one embodiment, when a product forming ingredient package is inserted into an optimum matrix location, the controller 500, by way of an associated software program running in memory associated with the controller 500, can link to at least one other ingredient package matrix location, such that when an ingredient supply is not available from the currently in use ingredient package then the ingredient supply can commence from a product forming ingredient package placed in the optimum or desired matrix location. In operation, this can be used to better ensure that the oldest product forming ingredient package is used first and/or that the product forming ingredient package currently being used is emptied before the newly inserted product forming ingredient package commences delivering ingredient supply.

Figure 5:
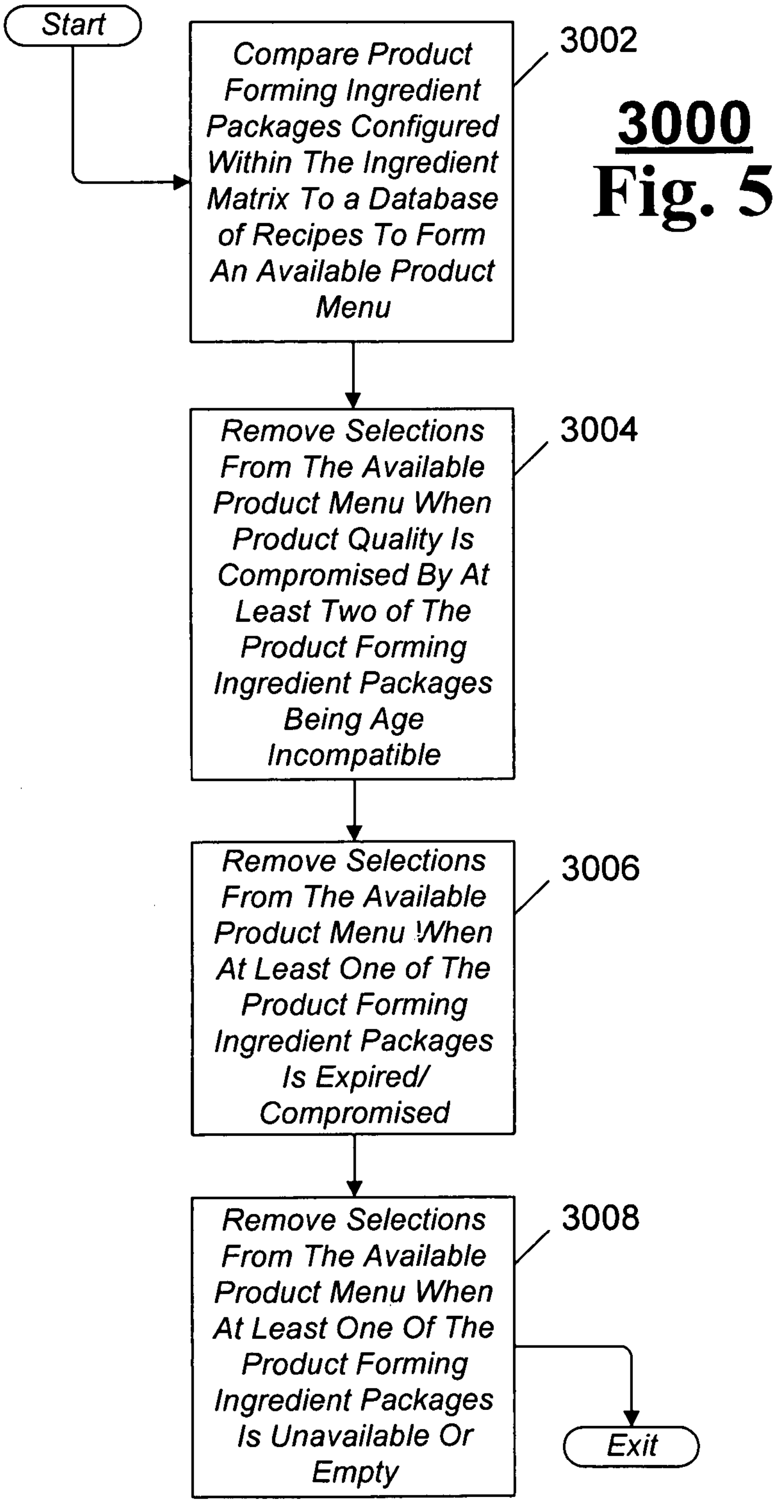
FIG. 5 illustrates one example of a method of managing an available product menu in accordance with an embodiment of the invention.

Referring to FIG. 5, there is illustrated one example of a method 3000 of managing an available product or beverage menu. In this method 3000, once product forming ingredient packages 114 are inserted into the ingredient matrix 112, a database of recipes can be queried to determine from the available ingredients, which products or beverages can be formed. This collection of possible products or beverages can be managed as an available product or beverage menu. In operation, certain conditions such as ingredient age and/or other incompatibility of ingredients, ingredient present but unavailable, and/or other reasons, the available product or beverage menu may have certain of the available menu product or beverage choices removed from the menu. Such other reason can include, for example and not a limitation, when the mixing of ingredients might compromise product or beverage quality. This can occur when the manufacturing date of all the ingredients is very diverse. In this regard, if a newer manufactured part 'A' of a recipe is mixed with certain older manufactured date part 'B' of the recipe, the product or beverage taste could be different then if both part 'A' and 'B' were of closer manufacturing date.

Another such reason, for example and not a limitation might include the detection of ingredient viscosity measurement outside a normal range indicating that the ingredient composition may have changed.

Another such reason, for example and not a limitation might include detection that a pump is not correctly calibrated which can cause too much or too little ingredients to be pumped. Such inaccuracies can occur when the composition of the ingredients in particular the viscosity of the ingredient and/or other efficiency of the pump change.

The method 3000 begins in block 3002.

In block 3002, one or more product forming ingredient packages 114 within the ingredient matrix 112 are compared to a database of product or beverage recipes to form an available product or beverage menu. Processing continues at block 3004.

In block 3004, product or beverage selections are removed from the available product or beverage menu when product or beverage quality is compromised by at least two of the product forming ingredient packages 114 being age incompatible and/or otherwise incompatible based on age. In this regard, even though a part 'A' and part 'B' ingredient of a product or beverage are present in the ingredient matrix if, for example and not as a limitation, the born on date is too far apart then combining the ingredients might not produce a quality tasting product or beverage. As such, the product or beverage choices are removed from the available product or beverage menu to avoid pouring a quality compromised product or beverage. Processing continues at block 3006.

In block 3006, product or beverage selections are removed from the available product or beverage menu when at least one of the product forming ingredient packages is expired or otherwise compromised to prevent pouring of a quality compromised product or beverage. Processing continues at block 3008.

In block 3008, product or beverage selections are removed from the available product or beverage menu when at least one of the product forming ingredient packages is unavailable or empty. What remains in the available product or beverage menu are beverages that can be poured without quality compromise concerns. The method 3000 ends at this block.

Figure 6:
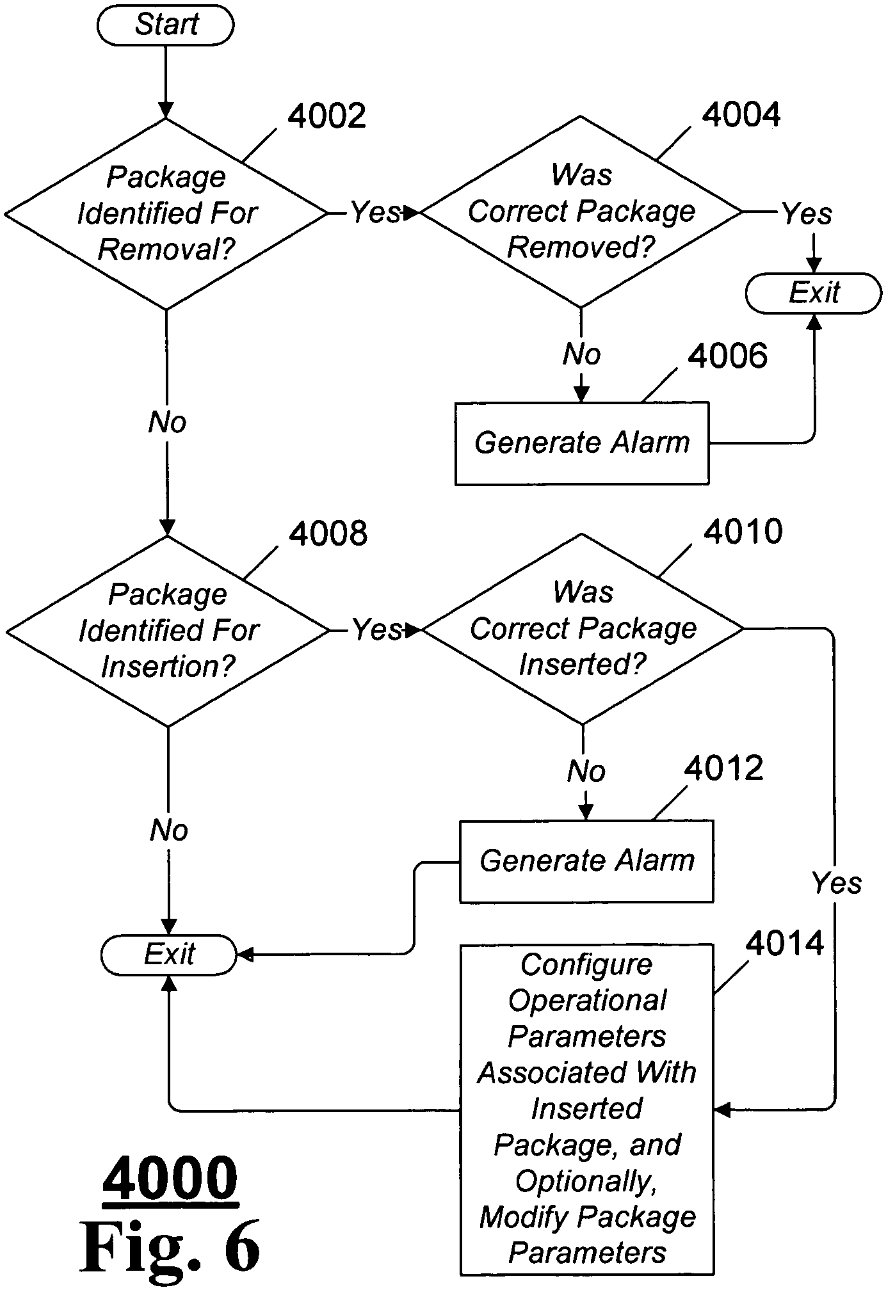
FIG. 6 illustrates one example of a method of verifying a product forming ingredient package is placed correctly in the ingredient matrix in accordance with an embodiment of the invention.

Referring to FIG. 6, there is illustrated one example of a method 4000 of verifying whether a product forming ingredient package is placed correctly or suitably in an ingredient matrix. In one embodiment, incorrect or unsuitable insertion of a product forming ingredient package, such as 114A in FIG. 1A, can cause all sorts of product or beverage quality problems and product dispenser issues. Examples of product or beverage quality problems and product dispenser issues can include, but are limited to, a wrong recipe pour, a misplaced pungent ingredient (which can ruin the dispenser), an ingredient that requires agitation is misplaced into a non-agitation matrix location causing unmixed ingredient to be dispensed, and/or other types and kinds of product or beverage quality and/or dispenser problems or occurrences. Therefore, a method of verifying whether a product forming ingredient package is correctly or suitably inserted into an ingredient matrix can improve optimum or desired product or beverage quality. The method 4000 begins in decision block 4002.

In decision block 4002, a determination is made as to whether a product forming ingredient package, such as 114A in FIG. 1, has been identified for removal from the ingredient matrix, such as 112. If the resultant determination is affirmative, that is, a package 114A has been identified for removal, then processing continues at decision block 4004. If the resultant determination is negative, that is, a package 114A has not been identified for removal, then processing continues at decision block 4008.

In decision block 4004, a determination is made as to whether the correctly identified for removal product forming ingredient package, such as 114A, was removed from the ingredient matrix, such as 112. If the resultant determination is affirmative, that is, the correct package 114A was removed from the correct matrix location 112, then the method 4000 ends. If the resultant determination is negative, that is, the correct package 114A was not removed from the correct matrix location 112, then processing continues at block 4006.

In block 4006, an alarm notification is generated alerting the fact that the wrong product forming ingredient package, such as 114A, was removed from the ingredient matrix, such as 112. In this event, the method ends at block 4006.

In decision block 4008, a determination is made as to whether a product forming ingredient package, such as 114A, has been identified for insertion in the ingredient matrix, such as 112. If the resultant determination is affirmative, that is, a package 114A has been identified for insertion into the ingredient matrix 112, then processing continues at decision block 4010. If the resultant determination is negative, that is, a package 114A has not been identified for insertion into the ingredient matrix 112, then the method 4000 ends at block 4008.

In decision block 4010, a determination is made as to whether the correctly identified for insertion product forming ingredient package, such as 114A, was inserted into the ingredient matrix, such as 112. If the resultant determination is affirmative, that is, the correct package 114 was inserted into the correct matrix location 112, then processing continues at block 4014. If the resultant determination is negative, that is, the correct package 114 was not inserted into the correct matrix location 112, then processing continues at block 4012.

In block 4012, an alarm notification is generated alerting the fact that the product forming ingredient package, such as 114A, was not inserted into the ingredient matrix correctly. In this event, the method ends at block 4012.

In block 4014, operational parameters associated with the inserted product forming ingredient package, such as 114A, can be configured. Such configuration parameters can be used to diagnose dispenser operation including, but not limited to, the determination of pump operation, valve operation, kinked, leaking, or missing tubes and indication of how much of the product forming ingredient package, such as 114A, has been dispensed. In addition, optional parameters associated with the product forming ingredient package, such as 114A, can be modified to prevent future moving of the package 114A from dispenser to dispenser. After configuration of operational parameters, the method 4000 ends at block 4014.

Figure 7:
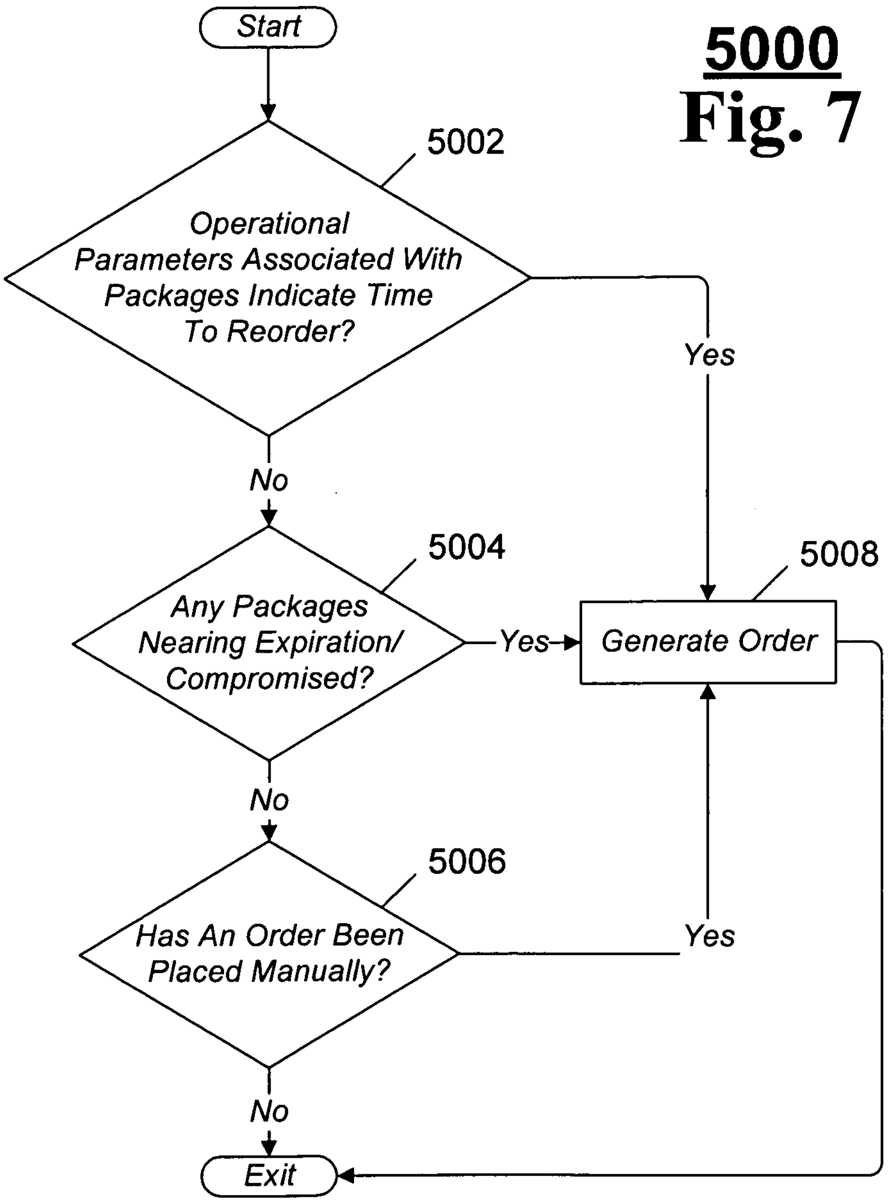
FIG. 7 illustrates one example of a method of generating a predictive product forming ingredient package order for replacement supplies in accordance with an embodiment of the invention.

Referring to FIG. 7, there is illustrated one example of a method of generating a predictive product forming ingredient package order for replacement supplies. In one embodiment, operational and other informational data related to the product dispenser and/or the plurality of product forming ingredient packages, such as 114A-114N in FIG. 1A, can be utilized to determine and generate predictive product forming ingredient package ordering of replacement supplies and ingredients. Operational and other informational data can include, but is not limited to, dispenser detected data, dispenser received data, package characteristics, package ingredient characteristics, or information associated with dispensing or forming a product or beverage using one of a package, ingredient, or dispenser. Other operational information can include environment condition in which the dispenser is located (ambient temperature, humidity, etc.), pump efficiency ratings, rates of dispensing, highest and lowest utilized ingredients, ingredient utilization by time of day and day of week, fluidic control data, local water pressures and quality analysis, and/or other type and kinds of conditions as may be required and/or desired in a particular embodiment.

The method 5000 begins in decision block 5002.

In decision block 5002, a determination is made as to whether operational parameters associated with the product forming ingredient packages, such as 114A-114N in FIG. 1A, indicate it is time to reorder. If the resultant determination is affirmative, that is, it is time to reorder, then processing continues at block 5008. If the resultant determination is negative, that is, it is not time to reorder, then processing continues at decision block 5004.

In decision block 5004, a determination is made as to whether any of the product forming ingredient packages, such as 114A-114N, are expired and/or compromised. If the resultant determination is affirmative, that is, some or all packages 114A-114N have expired and/or are otherwise compromised, then processing continues at block 5008. If the resultant determination is negative, that is, some or all packages 114A-114N have not expired and/or otherwise been compromised, then processing continues at decision block 5006.

In decision block 5006, a determination is made as to whether an order has been placed manually by service personnel. If the resultant determination is affirmative, that is, an order has been placed manually, then processing continues at block 5008. If the resultant determination is negative, that is, an order has not been placed manually, then the method 5000 ends at block 5006.

In block 5008, an order for supplies including required and/or desired product forming ingredient packages, such as 114A-114N, is generated. In one embodiment such a generated order can be data communicated to a data processing resource or server such as data processing resource 102, faxed or mailed to a fulfillment center, and/or otherwise processed as may be required and/or desired in a particular embodiment. In this event, the method 5000 ends at block 5008.

Figure 8:
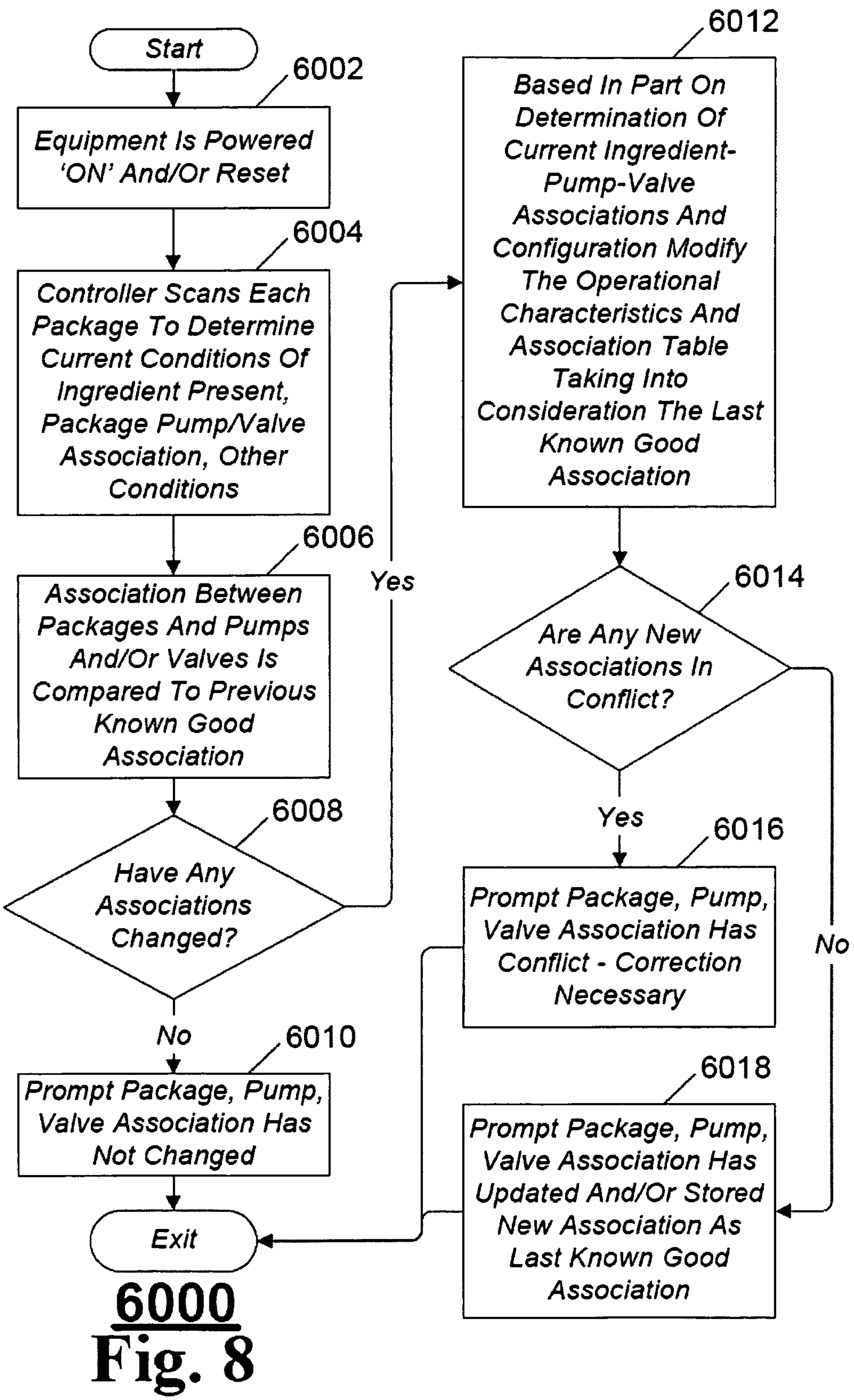
FIG. 8 illustrates one example of a method of dynamically reconfiguring an ingredient matrix in accordance with an embodiment of the invention.

Referring to FIG. 8, there is illustrated one example of a method of dynamically reconfiguring an ingredient matrix. In one embodiment, as related to a service technician making repairs or a service person restocking the product dispenser, product forming ingredient packages and pumps can from time to time be removed, replaced, exchanged, or in other ways the dispenser and ingredients modified. In these conditions, it may be likely that product forming ingredient packages are moved to different slots and/or pump/valve assemblies are changed. As such, when the product dispenser is next powered up or reset only then will the changes be determinable and of operational consequence. For example and not as a limitation, if there is a product forming ingredient package in the wrong or unsuitable ingredient matrix location, the incorrect or unsuitable recipe may be poured. In addition, a replacement pump associated with a product forming ingredient package can cause the ratio of the pour to be incorrect or unsuitable, resulting in poor product or beverage quality and/or taste. In this regard, often different ingredients have different viscosities. Furthermore, as viscosity of the ingredients change, from ingredient to ingredient, the characteristics of the pumps may have to change as well in order to deliver the correct or suitable ingredient at a proper or suitable ratio per the recipe.

The characteristics can be referred to as operational characteristics and can include, for example and not as a limitation, electrical and/or mechanical characteristics supplied to at least one of the pumps to compensate for the viscosity of the particular ingredient being pumped.

An advantage of an embodiment of the invention is that once a known good association exists, the dispenser can obtain information related to a plurality of product forming ingredient packages located in the ingredient matrix, determine an association related to the operational relationship between each of the plurality of product forming ingredient packages and each of a plurality of pumps, determine if the association has changed by comparison to the last known good association, and modify if the association has changed, the product dispenser to accommodate the new association.

In addition, another advantage of an embodiment of the invention can be that the plurality of said product forming ingredient packages configured within the ingredient matrix can be compared to a database of product or beverage recipes to form an available product or beverage menu. The method 6000 begins in block 6002.

In block 6002, the product dispenser also referred to as the equipment is powered on and/or reset. Processing continues at block 6004.

In block 6004, the controller 500 scans each of the plurality of product forming ingredient packages to determine the current conditions of the product forming ingredient packages, the current association between the product forming ingredient packages and the pumps and/or valves, and to determine other conditions as may be required and or desired by a particular embodiment. Conditions can include, but are not limited to, weight, amount of ingredient dispensed, amount of ingredient remaining, viscosity of the ingredient, and/or other types and kinds of conditions as may be required and/or desired in a particular embodiment. Furthermore, various associations can include, but are not limited to, any combination of any number of suitable pumps and valves capable of providing one or more ingredients from any number of product forming ingredient packages, or any combination of any number of suitable pumps and valves capable of providing at least one particular ingredient from any number of product forming ingredient packages. Processing continues at block 6006.

In block 6006, the association between the product forming ingredient packages and the pumps and/or valve is compared to a previous known good association. A previous known good association can include, but is not limited to, any combination of any number of suitable pumps and valves capable of providing one or more ingredients from any number of product forming ingredient packages or any combination of any number of suitable pumps and valves capable of providing at least one particular ingredient from any number of product forming ingredient packages. Processing continues at decision block 6008.

In decision block 6008, a determination is made as to whether any association between the product forming ingredient packages and the pumps and/or valves has changed. A determination can be facilitated by, for example, detecting via the ingredient matrix 112 if one or more product forming ingredient packages, such as 114A, have been removed, replaced, or are unavailable; or detecting via the controller, such as 500, whether any of the pumps and/or valves have been removed, replaced or are otherwise inoperative or unavailable. Another such way do detect association changes, for example and not a limitation, might be if vacuum level, or pressure level of ingredient supply lines between the nozzle and the ingredient packages changes and/or other viscosity of the ingredients change, indicating that association between the product forming ingredient packages and the pumps and/or valves may have changed. If the resultant determination is affirmative, that is, an association has changed, then processing continues at block 6012. If the resultant determination is negative, that is, an association has not changed, then processing continues at block 6010.

In block 6010, a prompt is made or generated to indicate that the product forming ingredient packages, pump and/or valve association has not changed. For example, a prompt can be generated via a display indicator, such as 504 in FIG. 2A, to indicate no change in an association. In this event, the method ends at block 6010.

In block 6012, based in part on the determination of the current product forming ingredient packages, pump and/or valve associations and configurations the operational characteristics and the association table are modified. This modification is done by taking into account the last known good association such that conflicts between where the product forming ingredient packages are located in the ingredient matrix and the association between the pumps and/or valves can be evaluated. One of the factors considered in this evaluation is whether pungent product forming ingredient packages and/or product forming ingredient packages requiring agitation are correctly located within the ingredient matrix. Another factor considered in this evaluation is the individual viscosities of the different product forming ingredient packages. In this regard, the operational performance characteristics may need to be changed with respect to the pumps and/or valves to better insure a recipe is accurately metered correctly and that the ratio of the ingredients necessary to form a product or beverage are maintained to insure product or beverage quality. Such characteristics can include, but are not limited to, electrical and/or mechanical characteristics of at least one of the pumps or valves to control or compensate for a viscosity of a particular ingredient being pumped. Processing continues at decision block 6014.

In decision block 6014, a determination is made as to whether the new associations have created a conflict. An example of a conflict can include, but is not limited to, possible use of one or more pumps, valves, or lines in an association which have been previously used with one or more pungent-type ingredients, possible use of pumps, valves, or lines in an association which have been previously used with one or more ingredients incompatible with at least one other ingredient, or possible use of at least one dispenser component in an association which may not be compatible with ultimately dispensing a quality or suitable product or beverage. Another such conflict, for example and not a limitation, might be if vacuum level or pressure level of ingredient supply lines between the nozzle and the ingredient packages is not in a normal acceptable range, indicating that ingredient supply lines may be kinked, blocked, or not properly sealed. If the resultant determination is affirmative, that is, a conflict has been created, then processing continues at block 6016. If the resultant determination is negative, that is, a conflict has not been created, then processing continues at block 6018.

In block 6016, a prompt indicates that there is a product forming ingredient package, pump, and/or valve conflict that requires attention to remove a conflict before operation of the product dispenser can resume. For example, a prompt can be generated via a display indicator, such as 504 in FIG. 2A, to indicate attention is needed to remove a conflict. In this event, the method ends at block 6016.

In block 6018, a prompt indicates that the product forming ingredient packages, pump, and/or valve new association has been updated and/or stored as the last known good association. For example, a prompt can be generated via a display indicator, such as 504 in FIG. 2A, to indicate an update or storage of a new association. In this event, the method ends at block 6018.

The capabilities of various embodiments of the invention can be implemented in software, firmware, hardware or some combination thereof.

As one example, one or more aspects of the invention can be included in an article of manufacture (e.g., one or more computer program products) having, for instance, computer usable media. The media has embodied therein, for instance, computer readable program code means for providing and facilitating the capabilities of the embodiment of the invention. The article of manufacture can be included as a part of a computer system or sold separately.

Additionally, at least one program storage device readable by a machine, tangibly embodying at least one program or set of instructions executable by the machine to perform the capabilities of the embodiment of the invention can be provided.

The flow diagrams depicted herein are examples. There may be many variations to these diagrams or the elements (or operations) described therein without departing from the scope of the claimed invention. For instance, the elements may be performed in a differing order, or elements may be added, deleted or modified. All of these variations are considered a part of the claimed invention.

While embodiments of the invention have been described, it will be understood that those skilled in the art, both now and in the future, may make various improvements and enhancements which fall within the scope of the claims which follow. These claims should be construed to maintain the proper protection for the invention first described.

The claimed invention is:

1. A product dispenser, comprising:

an ingredient matrix operable to receive a plurality of ingredient packages within respective locations, wherein a first ingredient package of the plurality of ingredient packages can be received in multiple ones of the respective locations; and a controller in communication with the ingredient matrix and operable to execute a set of instructions operable to:

receive information associated with the first ingredient package prior to or during insertion of the first ingredient package into the ingredient matrix;

determine at least one location of the respective locations within the ingredient matrix for insertion of the first ingredient package, wherein the at least one location is selected from the respective locations after the information is received; and output the determined at least one location to an output device to instruct a user regarding where the first ingredient package is to be inserted into the ingredient matrix.

2. The dispenser of claim 1, wherein the determination of at least one location within the ingredient matrix for insertion of the the first ingredient package comprises monitoring of availability of a location; availability of a product or beverage; product or beverage quality; ingredient freshness; compatibility between two or more ingredients, or a combination thereof.

3. The dispenser of claim 1, further comprising:

an ingredient package identifier operable to provide information to the controller, wherein the information is associated with the one or more ingredient packages.

4. The dispenser of claim 3, wherein the ingredient package identifier comprises at least one of the following: a machine readable code reader, a bar code reader, a RFID reader, a reflected light frequency reader, or an optical reader.

5. The dispenser of claim 1, further comprising:

a user interface operable to display the at least one location within the ingredient matrix for the first ingredient package.

6. The dispenser of claim 5, wherein the user interface comprises at least one of the following: an input/output device; one or more LED indicators; a LCD; or a device operable to receive at least one input from a consumer, wherein the input is associated with at least one product or beverage.

7. The dispenser of claim 1, wherein the information can be received by way of at least one of the following: manually input information associated with at least one product or ingredient package, automatically input information associated with at least one product or ingredient package, or a combination of automatically input information associated with at least one ingredient package and manually input information associated with at least one product or ingredient package.

8. The dispenser of claim 1, wherein the set of instructions is further operable to:

communicate via a network to transmit instructions or information between the controller and a remote device.

9. The dispenser of claim 8, wherein the remote device comprises at least one of the following: a data storage device, a database, a server, a processor, a product dispenser, a dispenser, a vending machine, or a client-type device.

10. The dispenser of claim 1, wherein the set of instructions is further operable to:

generate at least one product menu comprising at least one available product selection based at least in part one or more ingredient packages inserted within the ingredient matrix.

11. The dispenser of claim 1, wherein the set of instructions is further operable to:

verify whether the selected one or more ingredient packages is inserted within the at least one location within the ingredient matrix.

12. The dispenser of claim 10, wherein the set of instructions is further operable to:

modify the at least one product menu if at least one ingredient package inserted within the ingredient matrix in incompatible with another ingredient package.

13. The dispenser of claim 1, further comprising:

at least one database in communication with the controller;

wherein the set of instructions is further operable to:

transmit instructions or information between the controller and the at least one database.

14. The dispenser of claim 1, wherein at least a portion of the information comprises beverage recipe information.

15. The dispenser of claim 1, wherein the set of instructions is further operable to:

transmit an order to a remote location, wherein the order comprises at least one of the following: an order for one or more ingredient packages; an order for service to the product dispenser; or an order to facilitate restocking of or service to the product dispenser.

16. A method for configuring an ingredient matrix associated with a product dispenser comprising a plurality of dispensing devices, the method comprising:

receiving information associated with one or more ingredient packages prior to or during insertion into the ingredient matrix, wherein the ingredient matrix is operable with a first ingredient package of the one or more ingredient packages positioned in a plurality of locations within the ingredient matrix;

determining at least one location of the plurality of locations within the ingredient matrix for insertion of the first ingredient package, wherein a second ingredient package was previously inserted in the at least one location, the second ingredient package comprising a different ingredient than the first ingredient package; and outputting second information representative of the at least one location via an output device, wherein the second information instructs a user regarding placement of the first ingredient package in the ingredient matrix.

17. The method of claim 16, wherein the information comprises at least one of the following: identification of one or more of the ingredient packages as containing a pungent ingredient, or identification of one or more of the ingredient packages as containing an ingredient requiring agitation.

18. The method of claim 16, wherein determining at least one location within the ingredient matrix for the first ingredient package comprises monitoring at least one of the following: availability of a location; availability of a product or beverage; product or beverage quality; ingredient freshness; or compatibility between two or more ingredients.

19. The method of claim 16, wherein the at least one location comprises at least one of the following: an optimum location, an available location, an empty location, a location with an existing empty package, a location with a nearly empty package, or a location that is unallocated.

20. The method of claim 16, further comprising:

receiving at least one of the following: manually input information associated with at least one product or ingredient package, automatically input information associated with at least one product or ingredient package, or a combination of automatically input information associated with at least one ingredient package and manually input information associated with at least one product or ingredient package.

21. The method of claim 16, further comprising: communicating instructions or information from a remote device via at least one network.

22. The method of claim 21, wherein the remote device comprises at least one of the following: a data storage device, a database, a server, a processor, a product dispenser, a dispenser, a vending machine, or a client-type device.

23. The method of claim 16, further comprising: verifying whether the first ingredient package is inserted within the at least one location within the ingredient matrix.

24. The method of claim 16, further comprising: detecting an event associated with at least one of the plurality of ingredient packages; and based at least in part on the event, determining whether to modify an association between the first ingredient package and one or more dispensing devices associated with the product dispenser.

25. The method of claim 24, wherein the event comprises at least one of the following: supplying power to the dispenser apparatus; resetting of the dispenser apparatus; detection of an unsuitable or incompatible ingredient package; determining an ingredient package contains a pungent-type or agitation required ingredient; determining that a conflict exists between two ingredient packages in the at least one association; detection of an ingredient package not associated with at least one previously stored beverage recipe; detection of an incorrect installation of an ingredient package; insertion of an ingredient package within the ingredient matrix; removal of an ingredient package within the ingredient matrix; expiration of an ingredient in an ingredient package; replacement of a particular ingredient package; or change in viscosity of an ingredient in an ingredient package.

26. The method of claim 16, further comprising: communicating instructions or information from at least one database associated with the product dispenser.

27. The method of claim 26, wherein at least a portion of the instructions or information comprises beverage recipe information.

28. A product dispenser, comprising:
an interface operable to output an available product menu;
an ingredient matrix operable to receive one or more ingredient packages within respective locations; and
a controller in communication with the ingredient matrix and operable to execute a set of instructions operable to:
receive information associated with one or more ingredient packages;
determine when an inserted ingredient package is not suitable for a location within the ingredient matrix; and
remove at least one product selection from the available product menu.

29. A product dispenser of claim 1, wherein the controller is further operable to execute a further set of instructions operable to apply an insertion rule associated with the at least one ingredient package, the insertion rule is configured to determine placement of the ingredient package into the ingredient matrix.

30. The dispenser of claim 1, further comprising:
identifying, based at least in part on the information associated with the one or more ingredient packages, an ingredient of the one or more ingredient packages; and
determining that the at least one location within the ingredient matrix is compatible with the identified ingredient.

31. The dispenser of claim 30, further comprising:
determining that the ingredient is a pungent ingredient or an agitation product forming ingredient; and
determining that the at least one location is compatible with a pungent ingredient or an agitation required product forming ingredient.

32. The dispenser of claim 3, wherein the ingredient package comprises at least one of the following: a machine readable code, a bar code, an RFID tag, a reflected light frequency indicator, or an optical indicator.

33. The dispenser of claim 5, wherein the user interface is displayed at the dispenser.

34. The method of claim 17, further comprising:
determining that the one or more ingredient packages contains a pungent ingredient; and
determining that the at least one location within the ingredient matrix is compatible with the pungent ingredient.

35. The method of claim 16, wherein the ingredient package comprises at least one of the following: a machine readable code, a bar code, an RFID tag, a reflected light frequency indicator, or an optical indicator.

* * * * *